United States Patent [19]

Woods et al.

[11] Patent Number: 4,634,142
[45] Date of Patent: * Jan. 6, 1987

[54] COMPUTER OPTIMIZED ADAPTIVE SUSPENSION SYSTEM

[75] Inventors: Lonnie K. Woods, Alpine; James M. Hamilton, El Cajon, both of Calif.

[73] Assignee: C & K Venture Income I-Coast, Los Angeles, Calif.

[*] Notice: The portion of the term of this patent subsequent to Aug. 28, 2001 has been disclaimed.

[21] Appl. No.: 644,806

[22] Filed: Aug. 27, 1984

Related U.S. Application Data

[63] Continuation-in-part of Ser. No. 523,279, Aug. 15, 1983, Pat. No. 4,468,050, and a continuation-in-part of Ser. No. 352,239, Feb. 25, 1982, Pat. No. 4,468,739, which is a continuation-in-part of Ser. No. 322,200, Nov. 17, 1981, abandoned.

[51] Int. Cl.$^4$ ............................................. B06G 9/00
[52] U.S. Cl. ....................................... 280/707; 280/714
[58] Field of Search ............. 280/6 R, 6 H, 6.1, 689, 280/707, 714, 772; 267/64.16, 64.28

[56] References Cited

U.S. PATENT DOCUMENTS

| | | | |
|---|---|---|---|
| 601,339 | 3/1898 | Freeman . | |
| 2,247,749 | 7/1941 | De Venel | 280/124 |
| 2,339,152 | 1/1944 | Connelly et al. | 265/47 |
| 2,893,104 | 7/1959 | Hancock | 267/15 |
| 2,967,062 | 1/1961 | D'Avigdor | 280/112 |
| 2,973,969 | 3/1961 | Thall | 280/124 |
| 2,993,705 | 7/1961 | D'Avigdor | 280/112 |
| 3,035,853 | 5/1962 | Klein | 280/124 |
| 3,063,701 | 11/1962 | Long, Jr. | 267/64 |
| 3,063,702 | 11/1962 | Long, Jr. | 267/64 |
| 3,063,703 | 11/1962 | Harbers et al. | 267/65 |
| 3,124,368 | 3/1964 | Corley et al. | 280/6 |
| 3,310,976 | 3/1967 | Bussell et al. | 73/65 |
| 3,321,210 | 5/1967 | Delchev | 280/6 |
| 3,331,458 | 7/1967 | Van Raden et al. | 177/141 |
| 3,420,325 | 1/1969 | McAlister et al. | 177/137 |
| 3,502,347 | 3/1970 | Busignies | 280/124 |
| 3,513,300 | 5/1970 | Elfenbein et al. | 235/150.2 |
| 3,574,352 | 4/1971 | Elliott | 280/124 |
| 3,584,893 | 6/1971 | Tuczuk et al. | 280/124 |
| 3,595,597 | 7/1971 | Wenham | 280/124 |
| 3,606,365 | 9/1971 | Strong | 280/6 |
| 3,608,925 | 9/1971 | Murphy | 280/112 |
| 3,666,286 | 5/1972 | Engfer | 280/124 |
| 3,720,425 | 3/1973 | Asano et al. | 280/124 |
| 3,727,941 | 4/1973 | Ciolli | 280/124 |
| 3,741,582 | 6/1973 | Eckert | 280/124 |
| 3,807,678 | 4/1974 | Karnopp et al. | 248/358 |
| 3,819,166 | 6/1974 | Ellis et al. | 267/64 |
| 3,830,138 | 8/1974 | Joneleit | 91/35 |
| 3,861,696 | 1/1975 | Gustafsson | 280/6 |
| 3,873,123 | 3/1975 | Joneleit | 280/124 |
| 3,881,736 | 5/1975 | Wilfert | 280/6.1 |
| 3,995,883 | 12/1976 | Glaze | 280/707 |
| 4,017,099 | 4/1977 | Hegel et al. | 280/707 |
| 4,034,334 | 7/1977 | Allyn | 340/27 |
| 4,054,295 | 10/1977 | Elliott | 280/6.1 |
| 4,065,154 | 12/1977 | Glaze | 280/707 |
| 4,076,275 | 2/1978 | Hiruma | 280/124 |

(List continued on next page.)

*Primary Examiner*—John J. Love
*Assistant Examiner*—Ross Weaver
*Attorney, Agent, or Firm*—Christie, Parker & Hale

[57] ABSTRACT

A vehicle suspension system in which a computer controls damping and spring forces to optimize ride and handling characteristics under a wide range of driving conditions. A controllable shock absorber connected between the wheel and frame of the vehicle includes a hydraulic sensor which provides signals to the computer which are representative of the position of the piston within the shock absorber. The computer utilizes these position signals to control compression and rebound hydraulic pressure regulators by continuously computing, utilizing programmed algorithms, compression and rebound damping forces that will yield the desired ride and handling characteristics. An air spring may be connected with the shock absorber for compression and rebound along the same axis. Pressure sensors and air pressure inlet and outlet valves are connected to the computer for adjusting the pressure within the air spring to provide the desired spring rate.

46 Claims, 13 Drawing Figures

U.S. PATENT DOCUMENTS

| | | | |
|---|---|---|---|
| 4,084,830 | 4/1978 | Daniel, Jr. et al. | 280/6.1 |
| 4,105,216 | 8/1978 | Graham et al. | 280/6 |
| 4,154,461 | 5/1979 | Schnittger | 280/710 |
| 4,162,083 | 7/1979 | Zabler et al. | 280/703 |
| 4,164,664 | 8/1979 | Kasiewicz | 307/118 |
| 4,168,840 | 9/1979 | Graham | 280/6 |
| 4,185,845 | 1/1980 | Misch et al. | 280/6 |
| 4,212,484 | 7/1980 | Fujii | 280/707 |
| 4,215,403 | 7/1980 | Pollard et al. | 364/424 |
| 4,267,736 | 5/1981 | Westbeck | 74/5.22 |
| 4,270,771 | 6/1981 | Fujii | 280/707 |
| 4,293,139 | 10/1981 | Brown | 280/6 |
| 4,333,668 | 6/1982 | Hendrickson et al. | 280/703 |
| 4,354,693 | 10/1982 | Maeda et al. | 280/714 |
| 4,368,900 | 1/1983 | Beusse | 280/707 |
| 4,382,603 | 5/1983 | Senoo | 280/6 |
| 4,382,604 | 5/1983 | Nakagawa | 280/6 |
| 4,386,791 | 6/1983 | Watanabe | 280/707 |
| 4,390,187 | 6/1983 | Maeda | 280/6 |
| 4,391,452 | 7/1983 | Ohmori | 280/6.1 |
| 4,396,202 | 8/1983 | Kami et al. | 280/6 |
| 4,402,527 | 9/1983 | Kakehi et al. | 280/707 |
| 4,433,743 | 2/1984 | Ohmori et al. | 180/41 |
| 4,433,849 | 2/1984 | Ohmori | 280/6 |
| 4,449,733 | 5/1984 | Iida et al. | 280/707 |
| 4,453,725 | 6/1984 | Kuwana et al. | 280/6 |
| 4,463,428 | 7/1984 | Gilliam | 364/463 |
| 4,466,625 | 8/1984 | Kondo et al. | 280/6 |
| 4,468,050 | 8/1984 | Woods et al. | 280/707 |
| 4,468,739 | 8/1984 | Woods et al. | 280/714 |

FOREIGN PATENT DOCUMENTS

| | | |
|---|---|---|
| 1079482 | 11/1954 | France . |
| 2173364 | 10/1973 | France . |
| 2386427 | 11/1978 | France . |
| 7316435 | 6/1975 | Netherlands . |
| 1393808 | 5/1975 | United Kingdom . |
| 1522795 | 8/1978 | United Kingdom . |
| 2012913 | 8/1979 | United Kingdom . |
| 1591689 | 6/1981 | United Kingdom . |
| 1604416 | 12/1981 | United Kingdom . |

OTHER PUBLICATIONS

Burness, "The Long and Short of Suspension," Jul. 1978, pp. 4–7.

Monroe, "The Suspension System," pp. 3–8.

Cheok et al, "Optimal Suspension Design with Microcomputerized Parameter Optimizing Damping," Oct. 1984, pp. 113–119.

Margolis, "Semi-Active Suspensions for Military Ground Vehicles Under Off-Road Conditions," Sep. 1981, pp. 1–19.

Krasnicki, "The Experimental Performance of an 'On-Off' Active Damper," May 1981, pp. 125–131.

Krasnicki, "Comparison of Analytical and Experimental Results for a Semi-Active Vibration Isolator," Sep. 1980, pp. 69–76.

Crosby et al, "The Active Damper—A New Concept for Shock and Vibration Control," Jun. 1973, pp. 119–133.

Tomizuka, "'Optimum Linear Preview Control with Application to Vehicle Suspension'—Revisited," Sep. 1976, pp. 309–315.

Csere, "Technical Highlights," Nov. 1984, p. 65.

Csere, "Mitsubishi Galant," Oct. 1984, pp. 73–79.

Assenza, "1984 Lincoln Continental Mark VII LSC," Aug. 1983, pp. 27–32.

Retail Panel, "Shocks/Struts," Apr. 1984, pp. 27–28.

Baker, "High-Tech Developments Keep Faith with Legacy of Innovation," Mar. 1984, pp. 64–65.

Adler, "Mark VII Rivals Mercedes," Sep. 1984, pp. 20–21.

Csere, "Technical Highlights," p. 60.

Mazda, "Experience the 1983 Mazda 626 Sport Sedan, Sport Coupe, and Unique New 5-Door Touring Sedan," 1983.

Ford, "Ford's 1984 Mark VII Offers Auto Touring Luxury," 1984.

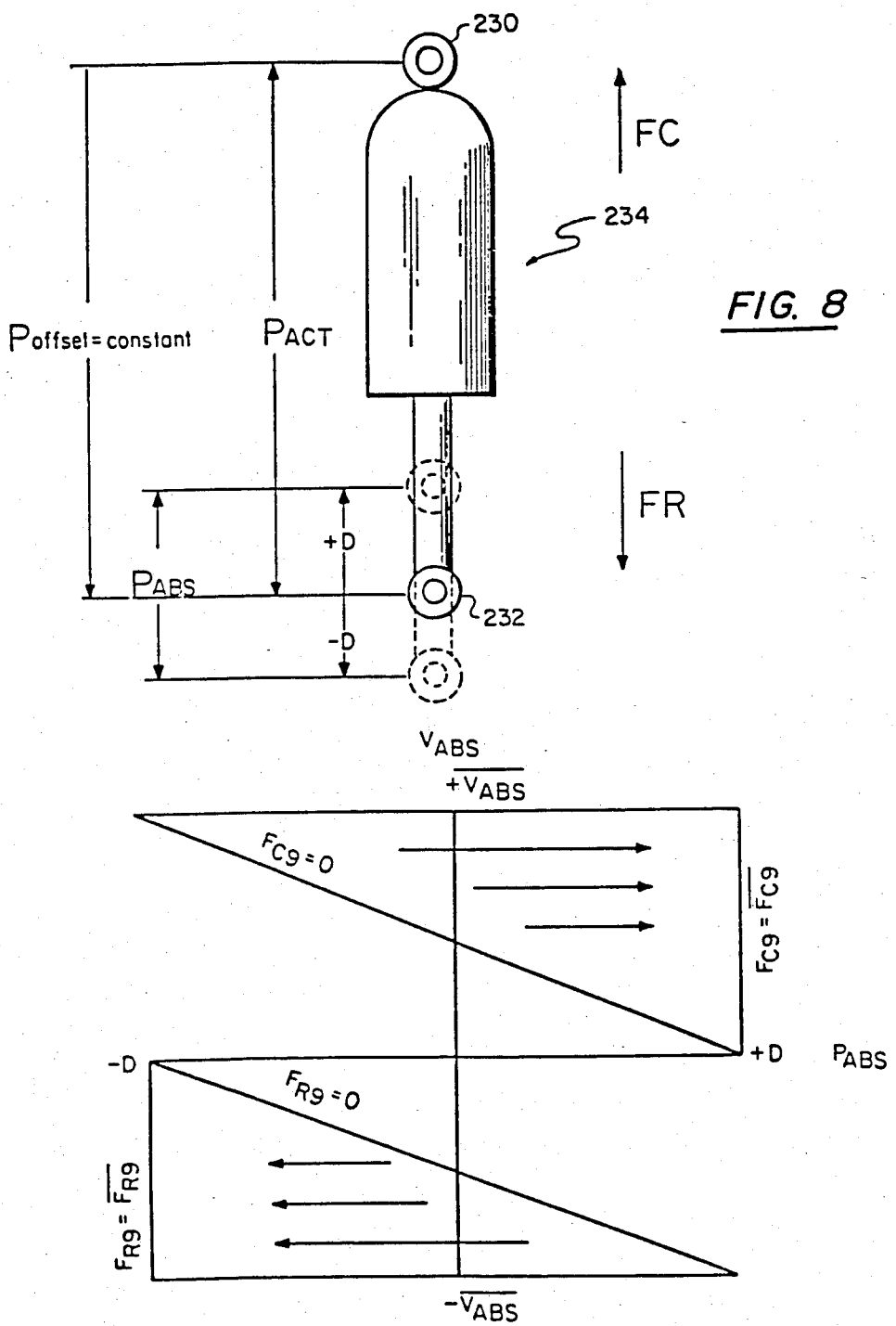

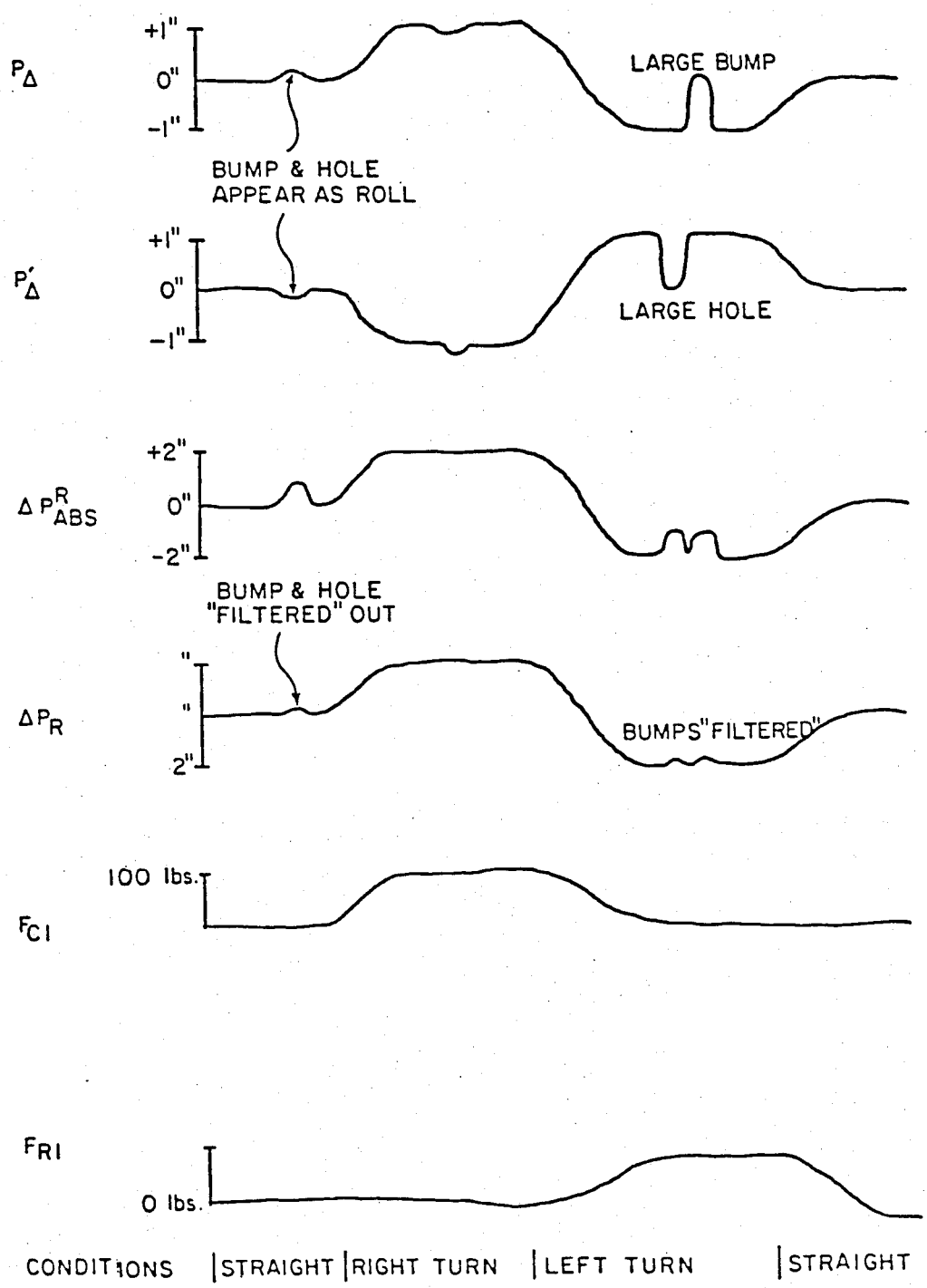

COMPUTER OPTIMIZED ADAPTIVE SUSPENSION SYSTEM

CROSS REFERENCE TO RELATED APPLICATIONS

This application is a continuation-in-part of U.S. Ser. No. 523,279 filed Aug. 15, 1983 now U.S. Pat. No. 4,468,050, and U.S. Ser. No. 352,239 filed Feb. 25, 1982 now U.S. Pat. No. 4,468,739, the latter being a continuation-in-part of U.S. Ser. No. 322,200 filed Nov. 17, 1981 (now abandoned).

FIELD OF THE INVENTION

The present invention relates to vehicle suspension systems, and more particularly to a vehicle suspension system in which a computer controls damping or spring forces or both to optimize ride and handling characteristics under a wide range of driving conditions.

DISCUSSION OF THE PRIOR ART

Vehicle suspension systems have heretofore included shock absorbers, springs (coil, leaf, air or torsion bar), axle housings, torque arms, A-frames, anti-roll bars and stabilizers, among others. These components have been assembled in various combinations to produce the desired ride and handling characteristics of the vehicle. More accurately, because many compromises must be made, the ride and handling characteristics are chosen to be as close to desired as possible. In a typical suspension system, changes in the spacing between axles and the body/chassis are cushioned by springs. Spring vibration is limited by dampers which are usually called shock absorbers.

In general terms a shock absorber is a velocity-sensitive hydraulic damping device which uses hydraulic pressure to resist movement of the suspension springs to limit and control the action of the springs. Piston velocity is a direct function of the speed of suspension movement. In any given shock absorber, a low piston velocity produces low pressure and little control, while higher piston velocity generates more pressure and greater control. Wheel movements, that is, changes in the relationship between axles (unsprung mass) and the chassis (sprung mass) are cushioned and controlled primarily by the suspension springs. The movement of the springs—spring vibration—is motion that must be limited, or damped by the shock absorbers.

It has been said that shock absorber design in one of the few facets of automotive engineering that remains more of an art than a science. Shock absorbers typically dissipate energy stored in the springs by gradually forcing oil through orifices and valves. The flow resistance encountered by the oil results in compression and rebound damping forces which control the spring movement. The work done by the oil as it moves through the valves converts energy stored in the springs into heat which is dissipated from the shock absorbers into the surrounding air. The ride can be made softer or stiffer by varying the fluid flow through the valves and orifices.

The amount of force exerted by a spring is proportional to how far it is deflected. The amount of force exerted by a hydraulic shock absorber is proportional to the velocity of the piston therein. Modern hydraulic shock absorbers include, for example, a six-stage valve system (three compression stages and three rebound stages) to provide optimum control at various piston velocities.

The goal in a conventional suspension system is to match the resistance or control force of the shock absorbers to the forces generated by their corresponding springs in a manner that will yield the desired ride and handling characteristics. The control forces which conventional shock absorbers exhibit during compression and rebound are determined by their particular bleed valves, blow-off valves, spring discs, blow-off springs or piston restrictions, etc. The damping curves (force versus piston velocity) of conventional shock absorbers are predetermined by their construction and are not adjusted during vehicle travel. However, the responses of such suspensions are fixed and their shock absorbers can respond in a desired manner to only a limited range of conditions, with arguably optimum response available in an even more limited range of conditions.

In the past various manual and automatic vehicle leveling systems have been devised for maintaining a predetermined height between the sprung mass of the vehicle (frame and body) and the unsprung mass (wheels, drive train, front axle and rear axle). Many of these systems pump air into, or discharge air from, air springs to raise or lower the vehicle body relative to its wheels. Exemplary vehicle leveling systems are disclosed in U.S. Pat. Nos. 3,574,352, 3,584,893, 3,666,286, 3,830,138, 3,873,123, 4,017,099, 4,054,295, 4,076,275, 4,084,830, 4,162,083, 4,164,664, 4,105,216, 4,168,840 and 4,185,845. The principal object of such vehicle leveling systems is to accommodate variations in vehicle load rather than to actively adjust shock absorbers and springs during vehicle travel to improve ride and handling.

Other vehicle suspension systems have been developed for automatically accommodating dynamic loading effects during vehicle travel. U.S. Pat. Nos. 2,967,062, 2,993,705 and 3,608,925 are directed to systems for controlling the roll of a vehicle, for example, during a turn. U.S. Pat. No. 3,995,883 discloses a vehicle suspension system in which a wheel-to-body displacement transducer and an acceleration transducer on the vehicle body produce signals which are utilized to vary the damping forces in the system. U.S. Pat. No. 4,065,154 discloses a vehicle suspension system in which signals from a plurality of wheel axle velocity transducers are utilized in varying the damping forces. British Pat. No. 1,522,795 discloses a vehicle suspension system in which an electrically actuable spool valve controls the application of fluid pressure to a damping control valve.

Other actively controlled vehicle suspension systems are disclosed in U.S. Pat. Nos. 2,247,749, 2,973,969, 3,124,368, 3,321,210, 3,502,347 and 4,215,403.

SUMMARY OF THE INVENTION

A primary object of the present invention is to provide an improved vehicle suspension system which will automatically adjust itself during vehicle travel to provide optimum ride and handling characteristics under a wide variety of driving conditions.

Another object of the present invention is to provide a computer optimized adaptive suspension system which will automatically reduce roll, pitch and oscillation, provide improved wheel rebound control and absorb large bumps optimally.

Still another object of this invention is to provide a vehicle suspension system which will automatically maintain a selected but adjustable wheel-to-body height for varying loading conditions.

Yet another object of the invention is to provide a vehicle suspension system capable of varying damping substantially independently of the velocity of the axle relative to the vehicle body.

A concomitant and more general object of the invention is to reduce shock absorber design and operation to a predictable science.

In the illustrated embodiment, a combined shock absorber/air spring unit is connected between the wheel and frame of a vehicle. It should be understood that the shock absorber or air spring unit can each be separated and either can be used alone with the other being of conventional design. The shock absorber includes a hydraulic sensor which provides signals representative of the position of the piston within the shock absorber and therefore of the position of the chassis with respect to axles. The computer utilizes these signals to control compression and rebound hydraulic pressure regulators to produce compression and rebound damping forces that will yield the desired ride and handling characteristics. The air spring may be connected in series or in parallel (concentric) with the shock absorber for compression and rebound along the same axis. Pressure sensors and air pressure inlet and outlet valves are connected to the computer for adjusting or regulating the pressure within the air spring to provide the desired spring rate.

The computer can be programmed so that the vehicle will provide an extremely smooth ride on level highways. Simultaneously, the computer may also be programmed so that only limited roll and pitch will be experienced during cornering and/or braking while bumps encountered during cornering and/or braking will be cushioned significantly. Computer programming may also simultaneously provide the vehicle with good off-road handling. Automatic load leveling may also be achieved. In summary, virtually any suspension characteristics can be achieved by appropriate programming. Thus, the suspension system for a given vehicle may provide an optimum set of ride and handling characteristics under all predictable conditions.

BRIEF DESCRIPTION OF THE DRAWING

The objects, advantages and features of this invention will be more readily understood from the following detailed description when read in conjunction with the accompanying drawing, in which:

FIG. 8 is a simplified definitional diagram of a shock absorber;

FIG. 9 is a graphical representation of roll control for a predetermined segment of time;

FIG. 10 is a diagram for the forces, positions and velocities involved in the topping out and bottoming out control functions;

DESCRIPTION OF THE PREFERRED EMBODIMENTS

Figure 1:
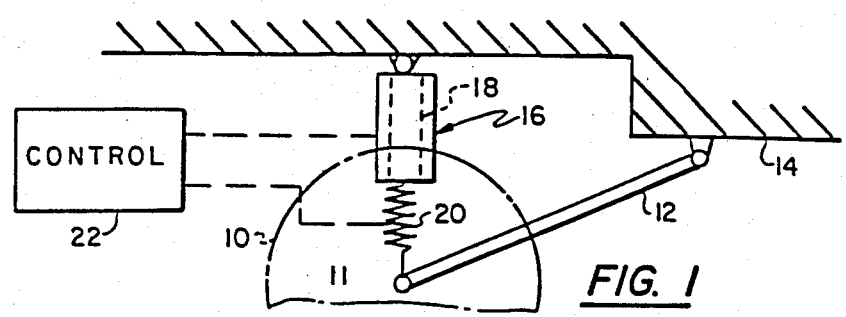
FIG. 1 is a diagrammatic illustration of a preferred embodiment of the suspension system of the present invention.

Referring to FIG. 1, in accordance with the present invention, a wheel 10 is rotatably mounted on an axle 11 which extends from one end of a carrier 12. The other end of the carrier is pivotally mounted to the frame or chassis and body 14 of the vehicle. It should be understood that any wheel mounting approach may be used. A suspension unit 16 is connected between chassis 14 and axle 11. Unit 16 combines an upper shock absorber 18 and a lower spring 20, which could be an air spring. The wheel, axle and carrier thus comprise the unsprung portion of the vehicle and the frame and body comprise the sprung portion of the vehicle. The damping forces of shock absorber 18 and the forces exerted by air spring 20 are varied by a control 22 in order to optimize the ride and handling characteristics of the vehicle under a wide range of driving conditions.

Figure 2:
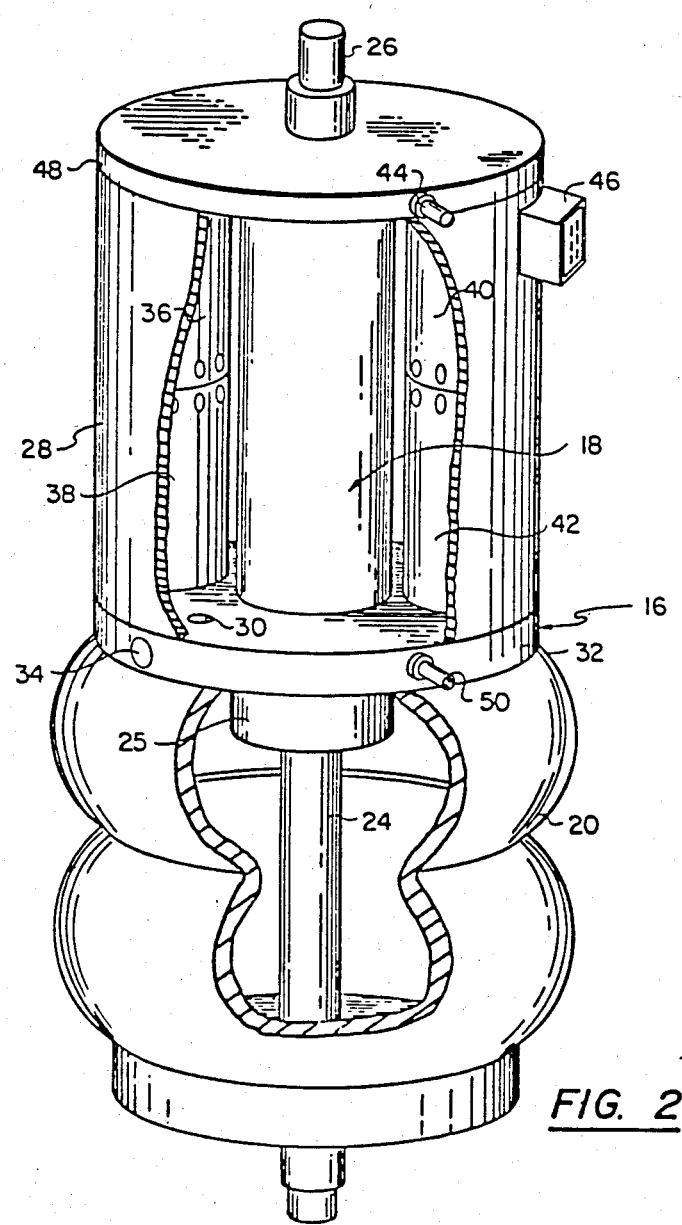
FIG. 2 is a perspective view, with portions broken away, of a preferred embodiment of the combined shock absorber/air spring unit of the suspension system of FIG. 1.

Referring to FIG. 2 by way of example, shock absorber 18 and air spring 20 of the suspension unit are arranged in series for simultaneous compression and rebound along the same longitudinal axis as the wheel of the vehicle moves up and down with respect to the frame. The shock absorber piston rod 24 extends axially through the center of air spring 20 and is connected to the axle of the wheel. The air spring is typically made of a flexible bellows. A connecting member 26 extends from the upper end of shock absorber 18 and is attached to the vehicle frame. The lower end of the air spring and rod 24 are interconnected in a known manner so that they move together.

An air tight cylindrical housing 28 concentrically surrounds shock absorber 18. During compression and rebound of air spring 20, air flows between the interiors of the air spring and housing 28 through a vent hole 30 in base 32 of the housing. This air flow helps dissipate heat from the shock absorber. The size of the vent hole and air space in housing 28 will affect the dynamic spring constant of air spring 20. Hydraulic fluid may be filled or drained from shock absorber 18 by removing a fill plug 34 which normally seals a passage that extends from the shock absorber through base 32 of the housing.

Within housing 28 are mounted a hydraulic compression pressure regulator 36 and a hydraulic rebound regulator 38. Also mounted within housing 28 are an air pressure inlet valve 40 and an air pressure outlet valve 42. An air inlet nipple 44 and an electrical connection jack 46 are provided on or adjacent upper cap 48 of the housing. An air outlet nipple 50 is provided on base 32 of housing 28. A resilient bump stop 25 is provided to protect the suspension on severe bumps.

Further details of an exemplary embodiment of suspension unit 16 will now be described by way of reference to the schematic diagram of FIG. 3. Note that the computer control of this invention may operate with shock absorbers of any suitable configuration, the only requirement being that they be controllable. Shock absorber 18 includes an inner cylinder 52 and an outer cylinder 54 which surrounds the inner cylinder and defines a reservoir 56. A main piston 58 is connected to the upper end of piston rod 24 and reciprocates longitudinally within inner cylinder 52. Piston 58 divides inner cylinder 52 into an upper chamber 60 and a lower chamber 62. Inner cylinder 52 and reservoir 56 of the shock absorber and all passages and chambers connected thereto are filled with a quantity of hydraulic fluid. There is no gas in contact with or in the fluid.

Piston 58 is slidable along the upper end of piston rod 24 between a pair of fixed flanges 64 and 66 and is centered between the flanges by springs 68 and 70. This resilient mounting of main piston 58 relative to piston rod 24 cushions any abrupt stops or starts of the piston, thereby eliminating the need for bleed valves in the main piston which are found in conventional shock absorbers. No fluid is intentionally allowed to pass between chambers 60 and 62 through piston 58.

While this is the presently preferred embodiment, because it allows the computer the maximum range of control over the compression and rebound damping forces through regulators, it is to be understood that the computer control of this invention may operate with shock absorbers having conventional valves in the main piston. Such an arrangement is discussed in connection with FIG. 12.

Shock absorber 18 is further provided with a compression amplifying valve 72 which is mounted above upper chamber 60. The function of the valve 72 is described hereafter in greater detail. It includes a central flanged spool 74 and an outer flanged spool 76 which reciprocates about spool 74. The reciprocation of these spools is limited by springs 78, 79 and 80.

A hydraulic position sensor 82 communicates with reservoir 56 of the shock absorber. It includes a piston 84 which is moved by fluctuations in the amount of hydraulic fluid within cylinder 52 due to the volume occupied by piston rod 24. Position sensor 82 also includes a transducer such as a linear variable differential transformer 86. This transducer generates signals representative of the position of piston 84 and therefore the position of main piston 58. It is clear that with the position of piston 58 known, the instantaneous relative positions of the sprung and unsprung masses are known.

Compression and rebound pressure regulators 36 and 38 may each comprise linear servo solenoid actuated valves. Signals may be applied to these solenoids to adjust the threshold blow off pressure required to open passages 37 and 39 held closed by respective solenoid pistons 85 and 87. This provides a pressure regulator whereby predetermined pressures within chambers 61 and 62 can be independently selected by valves 36 and 38, respectively. Fluid flow will be blocked until pressure reaches the preselected threshold pressure, at which time the valve opens and attempts to maintain that pressure.

Similarly, air pressure inlet and outlet valves 40 and 42 may each comprise solenoid actuated valves. Signals may be applied to these solenoids to meter the flow of air therethrough. The function of air pressure inlet and outlet valves 40 and 42 is to adjust or regulate the air pressure within air spring 20. The control circuit applies signals to the solenoids of these valves to meter the flow of air into and out of housing 28. This also adjusts the air pressure within air spring 20 since the air can flow from within the housing and into the air spring through vent hole 30. Air pressure inlet valve 40 is connected to a pressurized gas source, such as an accumulator 94 which is in turn connected to a pump 96. A pipe 98 connects the accumulator with inlet nipple 44. This nipple communicates with valve 40 through a passage 100 in cap 48. Air pressure sensors 99 and 101 generate signals representative of the air pressure within accumulator 94 and air spring 20, respectively. Outlet orifice 102 of valve 40 communicates with the interior of the housing. Inlet orifice 104 of air pressure outlet valve 42 also communicates with the interior of housing 28. Passage 90 formed in base 32 of the housing connects the outlet of valve 42 to outlet nipple 50. Passage 98 communicates the air pressure in accumulator 94 with all of the suspension units associated with the different wheels of the vehicle.

Various passages such as 88 for hydraulic regulator 36 and 90 for outlet valve 42, which connect the aforementioned regulators and valves to their fluid inputs and outputs, are formed in base 32 and cap 48 of housing 28. The leads such as 92 of the various solenoids are connected to control 22 via electrical connector 46 (see FIG. 2). For example, the control applies signals to the solenoids of regulators 36 and 38 to independently adjust the pressure of the hydraulic fluid in upper chamber 61 and in lower chamber 62 to provide predetermined compression and rebound damping forces. The pressure in chamber 61 sets the threshold pressure in chamber 60 by way of the pressure amplifying valve 72 to be described later. For purposes of this description the term "signals" will be used to include electrical signals or any other type which may be used to transfer information from one place to another in this system.

The general operation of suspension unit 16 (FIGS. 2 and 3) can now be described. When the unit undergoes compression and piston rod 24 moves upward, air spring 20 is compressed and energy is stored therein. The pressure of the hydraulic fluid in chamber 60 increases as much as pressure regulator 36 allows via amplifying valve 72. This determines the compression damping forces. During rebound, air spring 20 expands releasing the stored energy. The pressure of the hydraulic fluid in chamber 62 increases as much as regulator 38 allows. This determines the rebound damping forces.

Hydraulic fluid completely fills chambers 60 and 62 as well as reservoir 56, the valves of regulators 36 and 38 and the passages leading to and from these valves. Hydraulic fluid also fills passage 106 leading to postion sensor 82. The housings of sensor 82 and valves 36 and 38 have vent holes 108 to permit the pressurized air which is within air spring 20 and housing 28 to act on sides 85a and 87a of pistons 84, 85 and 87, respectively. The hydraulic fluid acts on the fluid side of the pistons 84, 85 and 87, respectively. In this way, the shock absorber adds to the spring rate of the air spring due to its pressure on the fluid within the shock absorber. In addition, the action of the pressurized air on one side 84a, 85a and 87a of pistons 84, 85 and 87 provides a pressure bias to the hydraulic fluid which aids in preventing the formation of gas bubbles or cavitation in the hydraulic fluid during reciprocation of the piston. A spring 400 can also be provided which acts on side 84a of piston 84 and adds to the pressure bias on the hydraulic fluid (FIG. 3). The lack of a spring on pistons 85 and 87 of the solenoids can be overcome by providing for the fluid in communication with the reservoir 56 to completely surround the pistons 85 and 87 including the portions within the electrical coils (85a, 87a). Otherwise, an appropriate bias spring can be added to the pistons 85 and 87 to balance the fluid pressure resulting from spring 400. It is to be understood that, although the presently preferred embodiment employs both the action of pressurized air and the action of spring 400 on side 84a of piston 84 to produce a pressure bias on the hydraulic fluid, either could be used alone or some alternate way of applying pressure to that side of piston 84 could be adopted. Avoiding bubble formation in the hydraulic fluid is important to maintain good damping characteristics in that fluid.

During compression and rebound, position sensor 82 provides signals to control 22 by means of leads 83 indicating the position of main piston 58 within the shock absorber. The control uses this position information to adjust regulators 36 and 38 as necessary to achieve predetermined compression and rebound damping forces. During compression, hydraulic fluid is pumped from upper chamber 60 of the shock absorber, through amplifying valve 72 via passage 114 or 115 or both, and the valve of regulator 36 and into reservoir 56. At the same time, hydraulic fluid from the reservoir is drawn through check valves 111 and into lower chamber 62 of the shock absorber. The amount of fluid which is pumped from upper chamber 60 and the amount of fluid which is pumped into lower chamber 62 during compression is not equal. This is because of the volume occupied by the portion of piston rod 24 which is progressively inserted into lower chamber 62 during compression. The extra hydraulic fluid moves piston 84 of the position sensor downwardly.

During rebound, hydraulic fluid is pumped from lower chamber 62, through pressure regulator 38 and into reservoir 56. Hydraulic fluid is also drawn from reservoir 56 through check valves 110 positioned in a seat member 112 of the compression amplifying valve 72 and into chamber 60. Piston 84 of position sensor 82 now moves upwardly since the volume occupied by the piston rod diminishes. The signals generated by transducer 86 thus accurately represent the position of the main piston within the shock absorber.

Compression pressure regulator 36 cannot adequately control exceedingly low compression forces which may be required in upper chamber 60, because orifice 37 is too small for the amount of fluid that must flow from chamber 60 into reservoir 56 during rapid movement of piston 58. Therefore, compression amplifying valve 72 enables low compression damping forces to be generated, by providing sufficient orifice size for large flow rates at low compression damping forces, as may be desired. In addition, exceedingly high compression forces can be provided by the compression amplifying valve at all flow rates.

Compression amplifying valve 72 operates as follows. As piston 58 starts to move upward, the pressure of the hydraulic fluid within chamber 60 increases. Spring 79 keeps spool 74 against orifice 115 for a minimum pressure in chamber 60. Hydraulic fluid is forced through an orifice 114 and check valve 116 in flanged spool 74 into upper chamber 61. The pressure within chamber 61 is adjusted by compression pressure regulator 36. If the pressure in chamber 61 is minimal, spool 76 rests against seal 117, and spool 74 rests against seat 112. As the velocity of main piston 58 increases, pressure builds up against the flange of spool 74. Spring 79 determines the blow-off force required to displace spool 74 upwardly. As spool 74 blows off, spring 80 is compressed.

As regulator 36 increases the pressure in upper chamber 61, spool 76 is pushed downwardly against springs 78 and 80. The force which pushes spool 76 downwardly is significantly greater than the force which pushes spool 74 upwardly, if chambers 60 and 61 are at similar pressure. This is because the area of the flange of spool 76 is significantly greater than that of spool 74. As spool 76 is pushed downwardly, the compression of springs 78 and 80 increases the force required for blow-off of spool 74 in such a manner as to set the threshold blow-off pressure in chamber 60 via spool 74 to that of chamber 61 plus the preset bias pressure set by spring 79. This establishes a blow-ff pressure for spool 74 to that set by pressure regulator 36 plus a small bias set by spring 79. This bias pressure insures that fluid flows through passage 114, opening check valve 116, and subsequently ensuring the proper operation of regulator 36 and amplifying valve 72. Check valve 116 insures that the desired pressure in chamber 61 as set by pressure regulator 36 remains during rebound (low pressure in chamber 60).

When the pressure in chamber 61 pushes spool 76 down to where spring 80 is completely compressed, spring 80 no longer functions. Any increased pressure in chamber 61 must be matched by several times that pressure in chamber 60 in order to blow-off flanged spool 74. This facilitates much higher pressure in chamber 60 than regulator 36 could produce. Proper selection of the strength of springs 78, 79 and 80 with respect to one another is required in order to achieve the compression amplifying function.

The rebound pressure regulator does not require the amplifying valve because the rebound speeds are more consistent since they deal primarily with the natural frequency of the unsprung mass. This can be adequately controlled by selection of the fixed size of passage 39 in combination with the variable threshold pressure set by pressure regulator 38. In addition, the rebound forces act differently on the chassis as affecting passenger comfort in such a way as to allow larger forces in rebound without affecting comfort the way that similar compression forces would.

Having described the mechanical aspects of a somewhat complex controllable shock absorber and air spring, we will now turn to the computerized control system of this invention. It should be noted that the principles of the invention apply equally to vehicles having two or more wheels with associated suspension units. Further, the principles apply basically to a controllable damping device with or without a controllable spring. That is, the controllable damping device of FIGS. 2 and 3, or any other controllable damping device, can be employed with the present system through the use of an air, leaf or coil spring, any of which may not be controllable, as well as with the controllable air spring discussed above.

Figure 3:
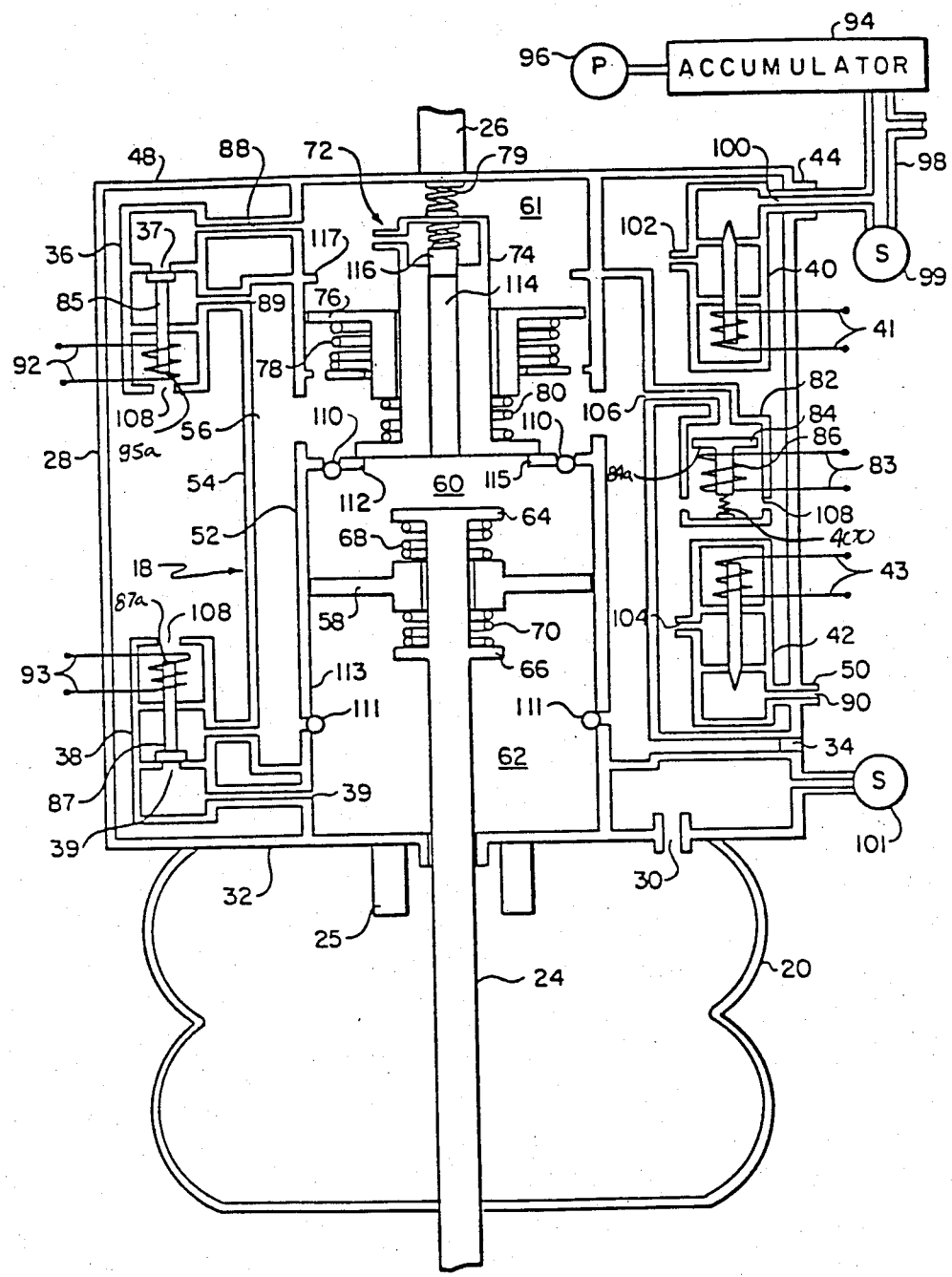
FIG. 3 is a schematic diagram of the combined shock absorber/air spring unit of FIG. 2.
Figure 4:
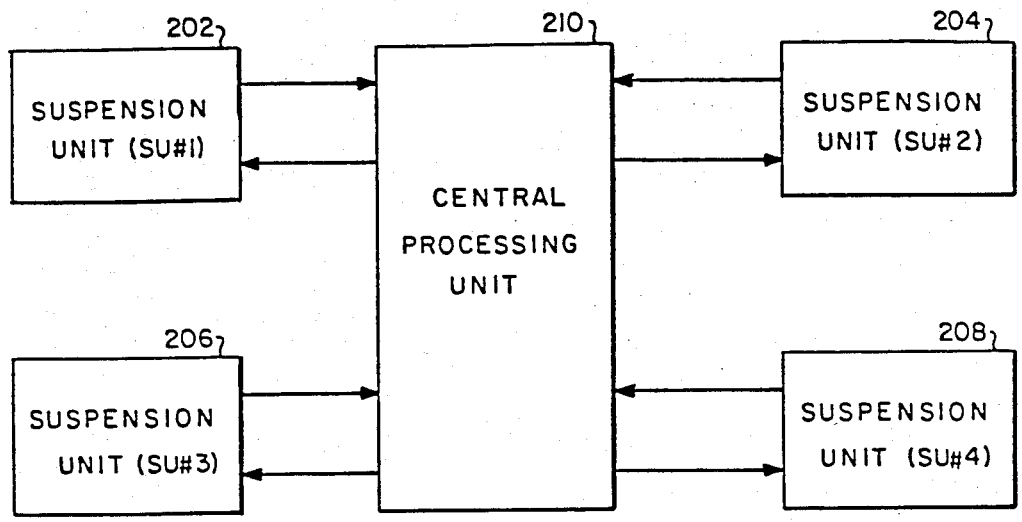
FIG. 4 is a basic block diagram of the control system of this invention.

The basic block diagram shown in FIG. 4 represents a typical four-wheeled vehicle showing four controllable suspension units 202, 204, 206 and 208 in communication with central processing unit 210. Each suspension unit may be of the form of FIGS. 2 and 3 or any other suitable controllable device. Note that there are input and output lines between each suspension unit and the central processing unit. The function and operation of each of these blocks will be discussed in greater detail below.

Figure 5:
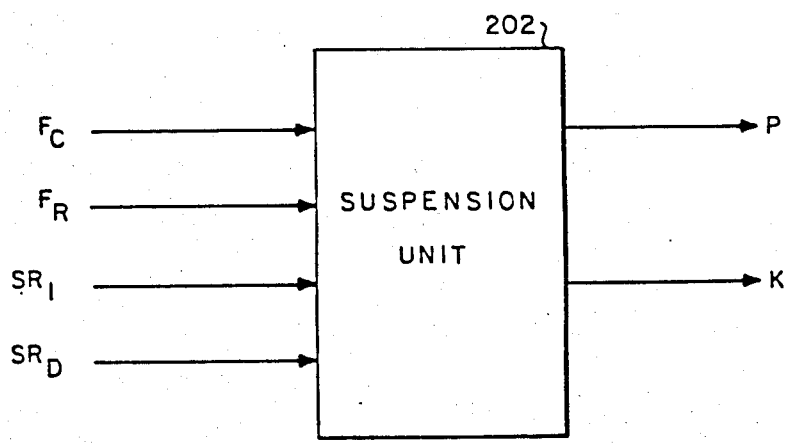
FIG. 5 shows the inputs and outputs for one suspension unit.

The block diagram of FIG. 5 represents one of the suspension units of FIG. 4 having four input signals and two output signals. $F_C$ is the control signal for setting the desired compression damping force and $F_R$ is the control signal for setting the desired rebound damping force of the suspension unit. Each damping force is substantially independent of the motion (velocity) of the axle with respect to the chassis. Stated another way, damping forces as controlled by this invention are substantially independent of velocity. The spring rate inputs of course apply to suspension units having controllable springs such as shown in FIGS. 2 and 3. The inputs $SR_I$ and $SR_D$ are signals that control the increase or decrease, respectively, of the spring rate. On the output side of suspension unit 202 of FIG. 5 is the signal P representing the position of the axle with respect to the chassis. In actual physical terms, it is the position of the piston within the shock absorber which is representative of the length of the shock absorber which, in turn, is representative of the actual position of the axle with respect to the chassis. The K output is a signal representative of the spring rate which relates to the air pressure of the air spring.

Figure 6:
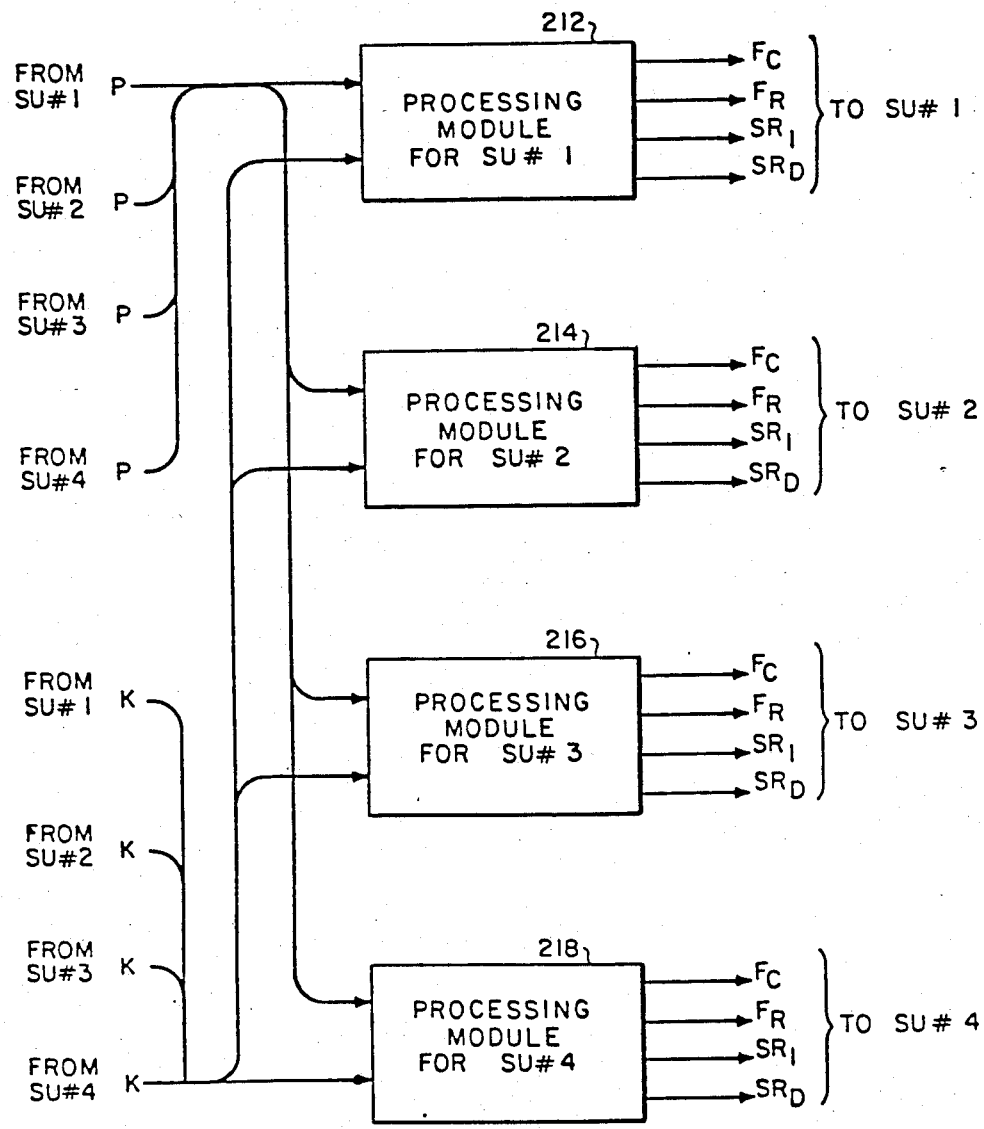
FIG. 6 is a block diagram of the processing modules with their inputs and outputs.
Figure 7:
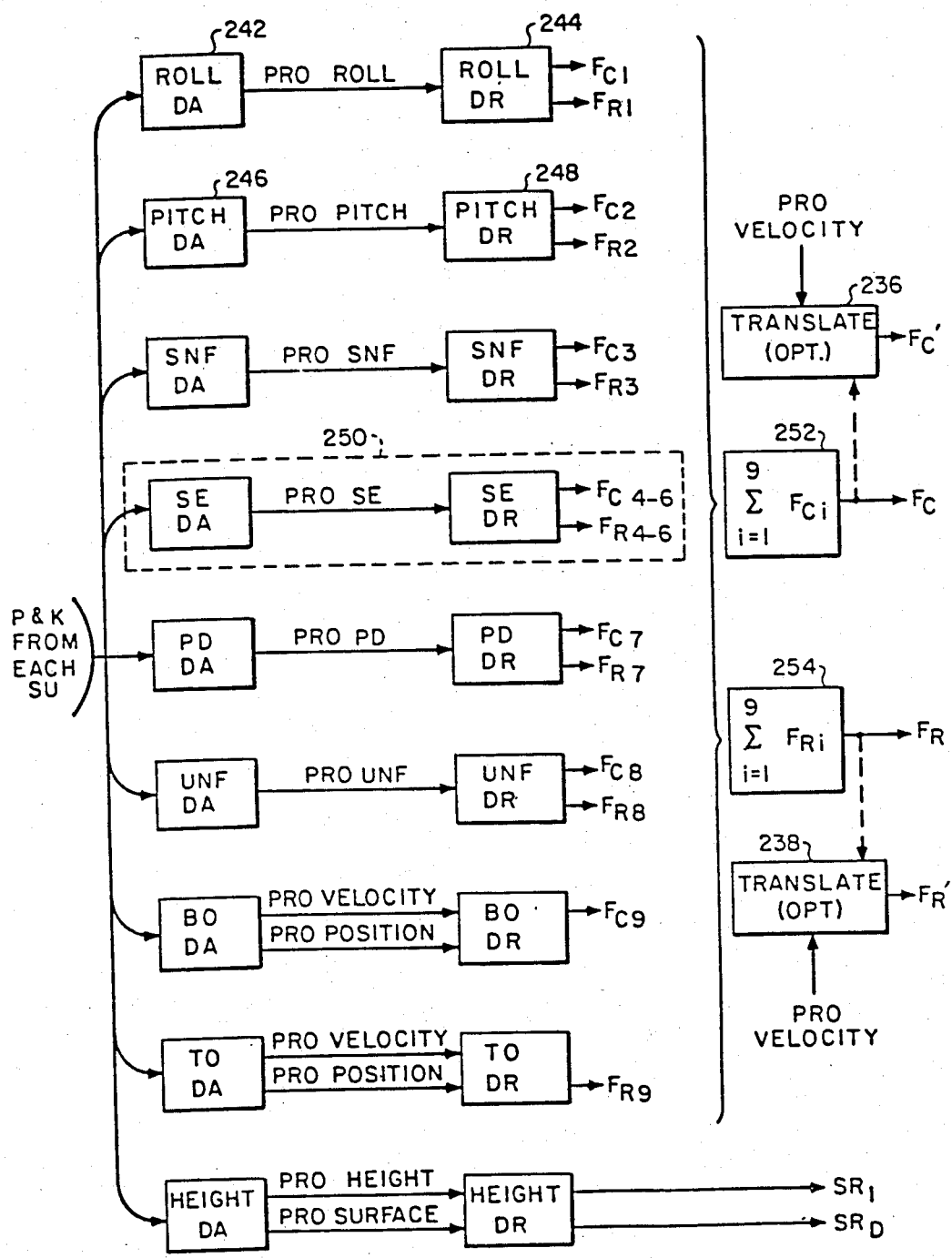
FIG. 7 is a detailed block diagram for the processing module of a single suspension unit.

The processing system of the present invention is shown in greater detail in FIG. 6. It is important to note that the position (P) and spring rates (K) for all of the suspension units are provided to a processing module associated with each suspension unit. Each processing module 212, 214, 216 and 218 has four outputs which are the inputs to each suspension unit described above with reference to FIG. 5. These four outputs set the desired spring rate and compression and rebound damping forces in real time for optimum control and performance of each of the suspension units independently but as a total composite to provide for the desired ride characteristics of the vehicle. Even though each suspension unit is independently controlled by the processing modules within the central processing unit, inputs from each suspension unit to each independent processing module ensures that the composite ride of the vehicle is controlled FIG. 7 is a detailed block diagram of the processing being performed by each processing module associated with each suspension unit. In effect, the FIG. 7 diagram is equivalent to one processing module of FIG. 6. The processing represented by FIG. 7 is the heart of the ability to optimally control the suspension system. The nine basic parameters of vehicle motion that are to be controlled and the manner in which they can easily be simultaneously and optimally combined are shown in FIG. 7. It is possible that more than nine parameters may be involved, or less for certain applications.

The desired response of each suspension unit due to its involvement in the various dynamics of the vehicle must be determined using appropriate conventional and easily understood mathematical algorithms. A set of proposed algorithms are described herein for completeness in demonstrating how the process can function. These algorithms are expository only and the invention is not limited to these particular methods of calculation.

In general, all motions of the vehicle and its suspension units that are to be controlled are individually determined by using detection algorithms that generate a parameter that indicates to what extent that motion affects that suspension unit. As shown in the drawing, each of the nine dynamic characteristic detection blocks of the vehicle have one or more output parameters representative of (PRO) that motion as affecting the desired response of that particular suspension unit. For example, the values P and K from each suspension unit are input to roll detection algorithm (DA) block 242, a total of eight inputs. The output of DA 242 is a parameter representative of roll (PRO ROLL) which is then acted upon by further processing blocks (244) that determine the desired damping and spring rates required to control those particular states of motion. The desired responses to correct for roll (DR ROLL) are $F_{C1}$ and $F_{R1}$. This can be done by predetermined mathematical equations or by means of a stored digital memory table look-up, either determined and set by the manufacturer to provide the right control determined during testing of a vehicle, or by analysis.

Each compression and rebound damping force desired for each motion is added together to give a composite and simultaneous resulting pair of compression and rebound damping forces desired by that suspension unit, thus providing the optimum control and response. This is because the summation of the individually required control forces ($\Sigma F_C{}^i$ and $\Sigma F_R{}^i$) yields the total desired result in control forces with minimal degradation of individual desired results.

The height control or load leveling function has two parameters representing states of motion. One indicates the condition of the road surface (PRO SURFACE), that is, smooth or bumpy, and the other indicates the average height of the vehicle above the road surface (PRO HEIGHT). Together, the desired response can be determined in such a way as to automatically lower the vehicle for better aerodynamics on smooth roads such as freeways or raise it to go over bumpy roads more easily by allowing more chassis clearance above the road surface, thus providing an automatic adaptive load leveling function. Under normal conditions it would be preferable to raise the chassis quickly when a bumpy surface is encountered, and lower it relatively slowly for a smooth surface aerodynamic advantages.

The signals $F_C$ and $F_R$ of FIG. 7 are representative of the desired compression and rebound damping forces as described above. If the suspension units utilize signals that correspond almost directly to the desired damping forces, such as the damping device shown in FIGS. 2 and 3, then those $F_C$ and $F_R$ outputs are usable to control that damping device directly through the appropriate interfaces. For visual reference purposes, basic force/position relationships are shown in the diagram of FIG. 8. Position parameter P is the instantaneous distance between the mounts 230 and 232 of shock absorber 234. Compression forces result from a reduction in the value of P as the vehicle wheel moves toward the chassis, indicated by the upwardly directed arrow $F_C$, and rebound forces act in the opposite direction as the wheel moves away from the chassis, represented by downwardly directed arrow $F_R$.

Graphic illustrations of terms used in algorithms set out elsewhere in this description are shown in FIG. 8. The difference from the normal mid-range of piston travel is $\pm D$. The instantaneous position $P_{ABS}$ is given by $$P_{ABS} = P_{OFFSET} - P_{ACT}.$$

$P_{OFFSET}$ is the distance between the chassis mount and the mid-range of piston travel and is a constant, while $P_{ACT}$ is the actual position of the piston.

The preferred embodiment of this invention as described herein is substantially velocity independent with respect to the motion of the damping device, that is, the motion between the axle and the chassis. However, the control system of this invention is adaptable to a velocity dependent suspension system. If the damping device has signal inputs that do not directly control the damping forces, but are dependent on other conditions, then a conversion must be made. For example, if the damping device involves velocity dependance, such as a situation resulting from incorporation of a servo-valve which controls the orifice size for control of the hydraulic fluid flow, then the damping force is dependent upon both the position signal and the velocity of the axle with respect to the chassis. In that case, for any desired force, the proper signals must be translated for any given velocity at that instant. This may be accomplished by taking these signals representative of the desired damping forces $F_C$ and $F_R$, and translating these to appropriate signals $F'_C$ and $F'_R$, which are a function of velocity and representative of the signals to provide the desired compression and rebound damping forces. This conversion is shown in FIG. 7 with optional TRANSLATE blocks 236 and 238 coupled to the outputs of the processing module. Simply stated, the damping force resulting from hydraulic fluid flow through an opening is primarily a function of the size of the opening and the flow rate. If the size of the opening is set by the signal and the flow rate is fixed by the velocity of the shock absorber piston then, if the desired force and the piston velocity are known, there is a direct relationship to the desired signal (opening size) and it can be easily computed. Notice that the control signals will be changing very rapidly with changing velocity and the damping device must also be able to respond with appropriate speed. In addition, this translation may be desired in the damping device that is substantially independent of velocity (the structure of FIGS. 2 and 3) to further optimize the control function.

In order to better understand the invention and its operation, it is appropriate to list a set of definitions and then to go through several detailed examples of the function of the system.

DEFINITIONS OF TERMS

"Spring Mass": this refers to the vehicle chassis which is mounted (sprung) on the suspension springs.

"Unsprung Mass": the wheel and axle supported by the road surface and free to move (unsprung) with the road variations.

"Spring": an energy storage device which allows movement between chassis and wheel of the vehicle for maintaining an average force that determines the average height of a chassis above the ground.

"Air Spring": a spring or energy storage device in which a flexible container holds air under pressure and attempts to change its size or length resulting in less space for the air and a corresponding increase in the pressure resulting in an increase in force. Hence it provides a spring rate that is adjustable by changing the initial air pressure and through the design of its shape.

"Spring Rate": this refers to the change in force of the spring per unit length of travel in pounds per inch when it is compressed. If offers stiffness to suspension movement so that higher rates means better control but a harsher ride.

"Shock Absorber": a damping device that helps to control the dynamic motions of the spring, wheels and chassis but generating resistance to relative motions of the chassis and wheel through dissipation of energy by means of hydraulic fluid flow through a system of valves and orifices.

"Compression Force ($F_C$)": the resistance to movement (pounds force) that the shock absorber produces when the wheel is moving toward the chassis.

"Rebound Force ($F_R$)": the resistance to movement (pounds force) that the shock absorber produces when the wheel is moving away from the chassis.

"Roll": refers to the tilt sideways of a vehicle when cornering.

"Pitch": refers to the tilt forward or backward when a vehicle is breaking, cornering or accelerating.

"Sprung Natural Frequency (SNF)": refers to the tendency of the sprung mass to oscillate on the springs when started in motion. The spring rate and vehicle weight determines the natural frequency of motion, typically about 1 Hz.

"Unsprung Natural Frequency (UNF)": this refers to the tendency of the unsprung mass to oscillate between the springs and the road surfaces when started in motion. The spring rate and the wheel and axle weight determine the natural frequency of motion and are typically about 15 Hz.

"Stored Energy (SE)": the energy stored in a spring when compressed. For purposes of this invention, it refers to the energy in a suspension spring when it has been compressed beyond its normal position, such as when a vehicle enters a steep driveway. The wheels compress upward toward the chassis when hitting the ramp and release that energy by causing the front of the vehicle to rise sharply and then rock up and down back to its normal position.

"Pumping Down (PD)": refers to a situation when the shock absorber compression forces during rapid wheel movements are less than the rebound forces such that the net or total resulting force on the chassis is predominantly downward, thereby overpowering the spring force and pulling the chassis lower to the ground so that there may be insufficient clearance and bottoming out occurs.

"Bottoming Out (BO)": this refers to the condition where a bump or other influence on the chassis or wheel causes the axle to try to rise toward the chassis closer than it can physically, that is, to exceed the dynamic range of the travel of the suspension. This can cause a severe jolt to the passengers and possibly damage the shock absorber or suspension.

"Topping Out (TO)": this is the condition where a hole or other influence on the chassis or wheel causes the axle to try to fall away from the chassis further than it can physically, that is, exceed the dynamic range of the suspension's travel. This can possibly damage the shock absorber or suspension.

"Height Control": this refers to the adjustment of the overall average height of a chassis above the road surface. It is accomplished by changing the air pressure in air springs or air pressurized load leveler shock absorbers. Refer to the description of FIG. 8 above.

DEFINITIONS OF SYMBOLS $P_{ABS}$: actual position of the piston ($\pm D$ inches)
$P_{MAX}$: length of shock fully extended ($-D$ inches)
$P_{MIN}$: length of shock fully compressed ($+D$ inches)
$P_{NORM}$: average of $P_{ABS}$ long term such as 30 seconds or more (inches)
$P_{AVE}$: short term (such as less than 15 seconds) average of $P_{ABS}$ (inches)
$P_A$: $P_{ABS} - P_{NORM}$ ($\pm D$ inches)
$P_H$: desired ride height (inches)
$\Delta P_H$: height hysterisis (inches)

$V_{ABS}$: is $P_{ABS}@t - P_{ABS}Et-1$ (inches per second)

DFT: Discrete Fourier Transform of $P_{ABS}$ giving amplitude of unsprung natural frequency (0 to D inches)

$F_C$: compression damping force desired $F_R$: rebound damping force desired

Parameter with no prime: refers to suspension unit under control

Parameter with prime: refers to opposite side suspension unit from that under control Parameter with double prime: refers to opposite end suspension unit from that under control Parameter with triple prime: refers to diagonal suspension unit from that under control Parameter with bar over: refers to maximum value desired Parameter with bar under: refers to minimum value desired $\Delta P_{ABS}^R$: $P_\Delta - P'_\Delta$ ($\pm 2D$ inches)

$\Delta P_{ABS}^P$: $P_\Delta - P''_\Delta$ ($\pm 2D$ inches)

$\Delta P_R$: is integrated roll position error ($\pm 2D$ inches)

$\Delta P_P$: integrated pitch position error ($\pm 2D$ inches)

$\Delta P_{PD}$: integrated pumped down position error ($\pm D$ inches)

$\Delta t$: computational update period

N: number of bits resolution in a computer word $\Delta R$: incremental step for $\Delta P_R$ integration (inches)

$\Delta P$: incremental step for $\Delta P_P$ integration (inches)

$\Delta PD$: incremental step for $\Delta P_{PD}$ integration (inches)

$\Delta H$: incremental step for $\Delta P_H$ integration (inches)

EXAMPLES

Some examples will be given to better illustrate how the actual equations will be utilized by the present invention to control the suspension system of a vehicle. It should be recognized that the numerical values that will be used are much larger than in actual practice in order to simplify the examples. In addition, most of the computations are continuously being revised in real time so that a rigorous development would be prohibitive here. However, the examples should be sufficient for a person skilled in the art to fully understand how these examples would ultimately be applied to an actual system.

In general, a number of variables are recomputed or modified repeatedly during each successive computer cycle, a cycle being defined as the complete execution of all of the program algorithms. These cycles will be performed about 250 times per second. Each cycle will generate some new values and modify some previous values of the variables, then determine the desired composite compression forces, rebound forces and spring rates for all of the suspension units. These desired values would then be output to the suspension units and held constant until the following cycles modify them on a continuous basis.

The detailed equations are intended as an example of how the basic application of this invention would be implemented. Any equations that perform according to the basic requirements of this invention may be used. A complete and rigorous "textbook" treatment of these common mathematical equations would not add useful information in the context of this specification. In order to fully, but simply, define their usage, the first set of control equations for roll control will be addressed in a detailed example in order to demonstrate how the process will be performed. This will be followed by minimal comments for the remainder of the control algorithms, each of which requires similar computations.

All of the equations involve commonly understood mathematics.

ROLL CONTROL

A vehicle of three or more wheels is subject to roll when it leans to the left or right such as during cornering or when subjected to cross winds. The detection algorithms (DA) are based on the natural frequency of the sprung mass. Approximately 100 ms integration of the actual position with respect to the chassis is accomplished for all of the wheels. The difference between these integrated values for the particular suspension unit under analysis and the one on the opposite side indicates a roll condition. The determination of roll is done by comparing front right to front left for the parameter representative of front right roll and front left to front right for the parameter representative of front left control. This processing is repeated in the same way for the rear. The integration averages out rapid changes in position, such as during rapid bumps, and only changes in position at the natural frequency of the sprung mass are detected.

The desired response (DR) for the suspension system is to reduce the amount of roll to which the chassis is subjected. If an axle is moving up toward the chassis due to roll, the compression damping force is raised accordingly to limit this condition as it occurs. Likewise, if the axle is moving away from the chassis, the rebound force is raised accordingly to reduce this condition. Combined, two opposite axles being controlled in this manner offer counter forces to those causing the roll condition, thus greatly reducing the roll that would normally occur. This example is for the left front wheel only.

The following equations and calculations are performed for each suspension unit to derive its optimum control settings for each $\Delta t$ period. The inputs to the detection algorithm portion of the processing module, ROLL DA block 242, are $P_{ABS}$ and $P'_{ABS}$. $P_{ABS}$ is the position P of the left front wheel provided by the position sensor and $P'_{ABS}$ is the position P of the right front wheel provided by the position sensor. Position P is the value P shown in FIG. 5. The range of the inputs is $\pm D$ inches and the resolution of these inputs is $-2^{N-1}$ to $+2^{N-1}$ steps at $D/2^{N-1}$ inches per step. The intermediate equations are as follows:

$P_{NORM}$ = Long term average of $P_{ABS}$ $P'_{NORM}$ = Long term average of $P'_{ABS}$ $P_\Delta = P_{ABS} - P_{NORM}$ $P'_\Delta = P'_{ABS} - P'_{NORM}$ $\Delta P_{ABS}^R = P_\Delta - P'_\Delta$ $\Delta P_R@t = \Delta P_R@t-1 + \Delta R \text{ (if } \Delta P_{ABS}^R > \Delta P_R@t-1\text{)}$ $\Delta P_R@t = \Delta P_R@t-1 - \Delta R \text{ (if } \Delta P_{ABS}^R < \Delta P_R@t-1\text{)}$ The output of ROLL DA block 242 is $\Delta P_R$, the parameter representative of roll (PRO ROLL). This becomes the input to the ROLL DR block 244 which must determine the desired response for that roll condition.

The outputs of the processing module, ROLL DR block 244, will preferably be determined from a look-up table in the processor memory and will be $F_{C1}$ and $F_{R1}$.

The range of the output will be 0 to $\overline{F_{C1}}$ (maximum valuue) for $F_{C1}$, 0 to $\overline{F_{R1}}$ (maximum value) for $F_{R1}$ and $-2D$ to $+2D$ for $\Delta P_R$. The resolution of the outputs will be: (1) 0 to $2^{N-1}$ steps at $\overline{F_{C1}}/2^{N-1}$ pounds per step for $F_{C1}$; (2) 0 to $2^{N-1}$ steps at $\overline{F_{R1}}/2^{N-1}$ pounds per step for $F_{R1}$; and (3) $-2^N$ to $+2^N$ steps at $2D/2^N$ inches per step for $\Delta P_R$.

Graphically, the outputs can be represented by the following:

TABLE I

| $\Delta P_R$ | $F_{C1}$ | $F_{R1}$ |
|---|---|---|
| +2D | $\overline{F_{C1}}$ | 0 |
| ↑ | ↑ | ↑ |
| 0 | 0 | 0 |
| ↓ | ↓ | ↓ |
| −2D | 0 | $\overline{F_{R1}}$ |

We will now provide a detailed description of the steps to be carried out employing the equations provided for roll control in order to show how and why the system accomplishes its purpose in limiting vehicle load during cornering. This example applies only to the left front wheel of a standard four-wheel vehicle. Total vehicle roll control will be provided only when all four suspension units have had similar calculations performed and subsequent forces determined for each unit. In addition, these forces for roll control must be combined with all of the other computed forces for the other dynamic motions that the system is controlling before deriving a pair of composite compression and rebound damping forces for that computer cycle, independently for each wheel.

For this example it will be assumed that the vehicle was travelling on a straight path and then was directed into a sharp right hand turn. This results in forces that tend to cause the vehicle to roll to the left, subsequently causing the left front wheel to move up and closer to the chassis and the right front wheel to move further away from the chassis. The purpose of the roll control function is to apply the proper counteracting damping forces to greatly limit this roll as it occurs. The following steps will show how the desired counteracting damping forces for the left front wheel would be computed, with the desired forces for the remaining wheels to be determined in the same manner.

Step 1: Computation of $P_{NORM}$

For purposes of this computation, $P_{ABS}$ is assumed to vary ±3 inches with 0 inches being the approximate normal position when the vehicle is resting at its desired height on a flat surface, and $P_{NORM}$ is the long term average of $P_{ABS}$ over about a 30-second period. The procedure for this step is that $P_{NORM}$ is assumed to be 0, since the vehicle has been travelling straight over a road surface with any bumps being averaged out, indicating that its desired height that was set by the height control function has remained constant over long periods. If this were not the case, the vehicle would be moving into the air or into the ground, conditions which are not permitted. The height control function may vary the value of $P_{NORM}$, but the following algorithms compensate for this automatically and still provide the desired function. The applicable computations for Step 1 are:

$P_{ABS}$=any allowed value in inches $P_{NORM}$=0 inches

Step 2: Computation of $P'_{NORM}$

For this step, relating to the right front wheel, $P'_{ABS}$ and $P'_{NORM}$ are defined in the same way as their counterparts for the left front wheel discussed above. The procedures and computations are also the same so that $P'_{ABS}$=any allowed value in inches $P'_{NORM}$=0 inches Step 3: Computation of $P_\Delta$ $P_\Delta$ has previously been defined. The vehicle is assumed to have started a right turn so that it begins to lean or roll to the left resulting in the left front wheel moving closer to the chassis. Assuming that it is 1 inch closer, the computations are as follows:

$P_{ABS} = +1$ inch $P_\Delta = P_{ABS} - P_{NORM}$ $P_\Delta = +1 - 0 = +1$

Step 4: Computation of $P'_\Delta$

The definition of the symbols employed have previously been set forth and we now deal with the wheel on the opposite side of the one subject to control, in this case, the right front wheel. The same explanation as that for Step 3 applies except that cornering is resulting in chassis movement upward on the right side so that the right front wheel is now summed to be 1 inch further from the chassis, with the following calculations:

$P'_{ABS} = -1$ inch $P'_\Delta = P'_{ABS} - P'_{NORM}$ $P'_\Delta = -1 - 0 = -1$ Step 5: Computation of $\Delta P_{ABS}^R$ This computation is to indicate the direction and extent that the vehicle could be rolling. The term $\Delta P_{ABS}^R$ applies to the left front wheel but it is derived from information about both front wheels. Since $P'_\Delta$ for the opposite side is subtracted from $P_\Delta$ for the wheel under control, the result indicates the direction and amount of roll that affects the left front wheel. Note that $P_{ABS}$ and $P'_{ABS}$ are changing with each computer cycle as the wheel moves. Therefore, $P_\Delta$ and $P'_\Delta$ are also changing. For this reason, $\Delta P_{ABS}^R$ only indicates the possible direction of roll at that particular time t. The road surface irregularities at each cycle could indicate different roll conditions. However, since the vehicle must maintain an overall equilibrium, that is, it must not ride sideways for very long before righting itself due to the springs, the actual condition of roll can be extracted by a type of digital filtering or integration as will be shown in subsequent computations. The computations for this step are:

$\Delta P_{ABS}^R = P_\Delta - P'_\Delta$ $\Delta P_{ABS}^R = (+1) - (-1)$ $\Delta P_{ABS}^R = +2$ inches Step 6: Computation of $\Delta P_R$ For purposes of this step, $\Delta_R$ is the predetermined constant of integration that determines the response of the filter (integration); t refers to time as indicated by one of the computer cycles and t−1 is the previous computer cycle; $\Delta P_R$ is the parameter indicating the direction and extent that the vehicle is actually rolling as extracted frrom $\Delta P_{ABS}{}^R$. The integration equations employed for this step require a decision as to whether the instantaneous roll indication ($\Delta P_{ABS}{}^R$) is greater or less than the previously computed actual roll indication ($\Delta P_R$). If roll is indicated to be greater than the previous value of actual roll ($\Delta P_{ABS}{}^R > \Delta P_R@t-1$), then the integration constant ($\Delta_R$) is added to increase the estimate of actual roll. If roll is indicated to be less than the previous value of actual roll ($\Delta P_{ABS}{}^R < \Delta P_R@t-1$), then the integration constant ($\Delta_R$) is subtracted to decrease the estimate of actual roll. Given the computation involved with this parameter, it is clear that if the wheels are randomly moving over bumps, the additions and subtractions will cancel, indicating no roll is occurring, that is, $\Delta P_R = 0$. If, however, the vehicle is starting to roll, the additions and subtractions will not offset and the direction and amount of roll will be indicated, that is, $\Delta P_R \neq 0$. In the present example for a right turn, the left front wheel is on average remaining closer to the chassis while the right front wheel is on average remaining further from the chassis.

For this computation, the integration constant will be assumed to be 0.5 inch, Further, since the vehicle was on a straight path prior to the right turn, the actual roll indication at the start of the turn is 0, that is, $\Delta P_R@t-1=0$. From the prior discussion, $\Delta P_{ABS}{}^R$ was computed to be +2 inches. Since this is greater than $0(\Delta P_{ABS}{}^R > P_R@t-1)$, 0.5 inches will be added to the actual roll indication ($\Delta P_R@t=\Delta P_R@t-1+\Delta R$). We have already defined $\Delta P_R$ for the conditions of $\Delta P_{ABS}{}^R$ increasing or decreasing. The computations involved in this step are as follows:

$\Delta_R = 0.5$ (constant)

$\Delta P_R@t = \Delta P_R@t-1+\Delta R$ $\Delta P_R@t = 0+0.5 = 0.5$ inches

Step 7: Computation of $F_{C1}$ and $F_{R1}$

The fact that roll is ocurring is now known by the computation of $\Delta P_R$ and the appropriate counteracting damping forces can be derived from that value by using predefined equations that must be processed. A faster and preferred approach is to use a table look-up within the processor memory. A digital memory contains all possible damping values stored at address locations that are related to the extent and direction of roll. When a new $\Delta P_R$ is derived, its value indicates where to go in the stored memory table to get the desired damping values. Such a table would be preprogrammed and easily changeable as desired by the vehicle manufacturer for the desired performance. An actual table would have about 256 entries, $\Delta P_R$ would be tabulated in hundredths of inch steps, and the damping forces would vary only a few pounds per step for much greater control and accuracy than provided in the example table shown below.

TABLE II

| $P_R$ | $F_{C1}$ | $F_{R1}$ |
| --- | --- | --- |
| +2.0 inches | 400 lbs. | 0 lbs. |
| +1.5 inches | 300 lbs. | 0 lbs. |
| +1.0 inches | 200 lbs. | 0 lbs. |
| +0.5 inches | 100 lbs. | 0 lbs. |
| +0.0 inches | 0 lbs. | 0 lbs. |
| −0.5 inches | 0 lbs. | 100 lbs. |
| −1.0 inches | 0 lbs. | 200 lbs. |
| −1.5 inches | 0 lbs. | 300 lbs. |

TABLE II-continued

| $P_R$ | $F_{C1}$ | $F_{R1}$ |
| --- | --- | --- |
| −2.0 inches | 0 lbs. | 400 lbs. |

From the table, the desired damping forces to control the indicated roll for the left front wheel during this particular computer cycle is $F_{C1} = 100$ lbs $F_{R1} = 0$ lbs It is important to know that $F_{C1}$ and $F_{R1}$ apply to the left front wheel and are for roll control only. By appropriate redefinition of $P'_{ABS} - P_{ABS}$, etc., similar damping values for the other three wheels can be computed. These values are temporarily stored while appropriate damping forces to control the other dynamics, that is, pitch, stored energy, etc., are also computed and stored during any given computer cycle. At the end of the cycle, the appropriate composite forces are determined by adding the individual forces and these are provided to the mechanical suspension units and held until the next cycle is completed and the values are replaced by the revised values. At 250 cycles per second, the damping forces become uniform and continuously varying functions that can provide near optimum performance.

If many examples of the above process were repeated, it would become clear that $\Delta P_R$ is continuously revised and always returns to 0 inches when the vehicle is not subject to roll. That is, for roll control, the algorithm keeps providing damping forces to counteract roll forces as they occur, and no forces when the vehicle is level, as desired.

It can be seen that $\Delta P_R$ is essentially a form of real time integration of a time-varying function that detects slow positional changes. The update period and the value of $\Delta_R$ set the bounds on the rate that position changes are detected. This allows the computer to ignore rapid variations such as bumps and holes. Since it is known that the natural frequency of the sprung mass limits the rate at which the chassis can roll, a proper choice for $\Delta_R$ and cycle time can be determined, despite rapid momentary fluctuations of the wheel due to road surface conditions.

A graphical demonstration of roll control is provided by FIG. 9. It is assumed that the vehicle is following a straight path and then is going into an S curve with a right turn followed by a left turn. It is also assumed that the road is relatively bumpy. Without rigorous calculations, using the above algorithms as described, a graphical representation of the variations of $P_\Delta$, $P'_\Delta$, $\Delta P_{ABS}{}^R$ and $\Delta P_R$ are shown, along with the resultant $F_{C1}$ and $F_{R1}$ signals. If the whole process of travelling through the curves took 5 seconds, the above algorithms would have been repeated 250×5 or 1,250 times. This graphical example shows the general process that would occur in such a hypothetical case. It should be remembered that this example is for left front wheel roll control only and it does not incorporate other parameters nor does it refer to the control of the other wheels.

From FIG. 9 it can be seen that a bump or a hole encountered while the vehicle is on the initial straight path is filtered out and results in no damping forces $F_{C1}$ or $F_{R1}$ being generated. The first two curves represent the two front wheel positions and $\Delta P_{ABS}{}^R$ is the difference between them. The integrated value $\Delta P_R$ follows the difference. Compression force $F_{C1}$ is applied to the left front wheel in the right turn, and $F_{R1}$ is applied to that wheel in a left turn.

PITCH CONTROL

The term pitch has been previously defined and applies to a vehicle with two or more wheels when it leans forward or backward as in braking, acceleration or cornering. The detection algorithms and desired response are substantially the same as for roll control except that the front wheel is compared to the rear wheel on the same side instead of being compared with the opposite wheel on the same end.

The inputs to the processing module PITCH DA block 246 are $P_{ABS}$ and $P''_{ABS}$. The range of the inputs is $\pm D$ inches and the resolution of these inputs is $-2^{N-1}$ to $+2^{N-1}$ steps at $D/2^{N-1}$ inches per step. The intermediate equations are as follows:

$P_{NORM}$=Long term average of $P_{ABS}$ $P''_{NORM}$=Long term average of $P''_{ABS}$ $P_\Delta = P_{ABS} - P_{NORM}$ $P''_\Delta = P''_{ABS} - P''_{NORM}$ $\Delta P_{ABS}{}^P = P_\Delta - P''_\Delta$ $\Delta P_P@t = \Delta P_P@t-1 + \Delta P(\text{if } \Delta P_{ABS}{}^P > \Delta P_P@t-1)$ .

$\Delta P_P@t = \Delta P_P@t-1 - \Delta P(\text{if } \Delta P_{ABS}{}^P < \Delta P_P@t-1)$ Again, $\Delta P_P$ is the output of PITCH DA block 246 going into PITCH DR block 248; which must determine the desired response for the pitch condition.

The outputs of the processing module PITCH DR block 248 will preferably be determined from a look-up table in the processor memory and will be $F_{C2}$ and $F_{R2}$. The range of the output will be 0 to $\overline{F_{C2}}$ (maximum value) for $F_{C2}$, 0 to $\overline{F_{R2}}$ (maximum value) for $F_{R2}$ and $-2D$ to $+2D$ for $\Delta P_P$. The resolution of the outputs will be: (1) 0 to $2^{N-1}$ steps at $\overline{F_{C2}}/2^{N-1}$ pounds per step for $F_{C2}$; (2) 0 to $2^{N-1}$ steps at $\overline{F_{R2}}/2^{N-1}$ pounds per step for $F_{R2}$; and (3) $-2^N$ to $+2^N$ steps at $2D/2^N$ inches per step for $\Delta P_P$.

Graphically, the outputs can be represented by the following:

TABLE III

| $\Delta P_P$ | $F_{C2}$ | $F_{R2}$ |
|---|---|---|
| +2D | $\overline{F_{C2}}$ | 0 |
| ↑ | ↑ | ↑ |
| 0 | 0 | 0 |
| ↓ | ↓ | ↓ |
| −2D | 0 | $\overline{F_{R2}}$ |

Pitch control is handled almost identically with that of roll control except that the differences are measured between front and rear wheels, that is, in braking the left front wheel moves closer to the chassis while the left rear wheel moves farther from the chassis. A different constant of integration, $\Delta P$, is used but otherwise the procedure is the same as that for roll control with each individual suspension unit being processed appropriately. The detection algorithms PITCH DA block 246 provides the parameter representative of pitch to desired response block 248 (PITCH DR) which determines the damping forces necessary ($F_{C2}$ and $F_{R2}$).

STORED ENERGY AND SPRUNG NATURAL FREQUENCY

Although independent processes, these control algorithms have been grouped together because of their similarity and relationship. The basic control processes given counteract the spring forces that act on the chassis due to changes in the axle positions with respect to the normal position or equilibrum. In addition, the stored (spring) energy can cause motions at the sprung natural frequency in two different ways. Therefore although the equations have been grouped together, each of the two will be separately addressed after the inputs, equations and outputs have been specified.

The inputs to the processing module are $P_{ABS}$, $P'_{ABS}$, $P''_{ABS}$ and $P'''_{ABS}$. The range of the inputs is $\pm D$ inches and the resolution of these inputs is $-2^{N-1}$ to $+2^{N-1}$ steps at $D/2^{N-1}$ inches per step. The intermediate equations are as follows:

$P_{NORM}$=Long term average of $P_{ABS}$ $P'_{NORM}$=Long term average of $P'_{ABS}$ $P''_{NORM}$=Long term average of $P''_{ABS}$ $P'''_{NORM}$=Long term average of $P'''_{ABS}$ $P_\Delta = P_{ABS} - P_{NORM}$ $P'_\Delta = P'_{ABS} - P'_{NORM}$ $P''_\Delta = P''_{ABS} - P''_{NORM}$ $P'''_\Delta = P'''_{ABS} - P'''_{NORM}$ The output of the processing module will preferably be determined from a look-up table in the processor memory and will be $F_{C3}$, $F_{C4}$, $F_{C5}$, $F_{C6}$, $F_{R3}$, $F_{R4}$, $F_{R5}$ and $F_{R6}$. The range of the output will be 0 to $\overline{F_{Ci}}$ for $F_{Ci}$ and 0 to $\overline{F_{Ri}}$ for $F_{Ri}$ where i=3, 4, 5, 6, and −D to +D for $P_\Delta{}^K$ where K=, ', '', '''. The resolution of the outputs will be: (1) 0 to $2^{N-1}$ steps at $\overline{F_{Ci}}/2^{N-1}$ pounds per step for $F_{Ci}$; (2) 0 to $2^{N-1}$ steps at $\overline{F_{Ri}}/2^{N-1}$ pounds per step for $F_{Ri}$; and (3) $-2^{N-1}$ to $+2^{N-1}$ steps at $D/2^{N-1}$ inches per step.

SPRUNG NATURAL FREQUENCY

This term has been defined previously. The detection algorithm could be a Discrete Fourier Transform Analysis, a well-known mathematical principle. However, it is desired that only one cycle of oscillation be permitted and therefore, a direct look at the position and movement of the axle with respect to the chassis is most desirable. This will indicate if the sprung mass is oscillating. The response desired for this parameter is that the suspension unit under analysis be controlled by applying a rebound force as it is compressed sp that it will return to its equilibrium position, but the rate of return will be slowed and some of the stored energy will be dissipated in the flow of hydraulic fluid through the valves. Likewise, as the spring is extended, the compression force is applied to slow the rate of return and dissipate the stored energy.

As in the other examples, the sprung natural frequency control process corresponds only to the suspension unit under control. If the axle and wheel corresponding to this unit is pushed upward above normal by a rise in the road surface, the compressed spring that exerts an upward force on a chassis will tend to cause the chassis to rise up at its natural frequency and potentially oscillate up and down. By applying a counteracting positive rebound damping force proportional to the amount of spring compression and spring rate, this oscillation can be effectively damped. In other words, the combination of the increased upward spring force and counteracting rebound damping force result in a near neutral force upward on the chassis, consequently preventing any sprung natural frequency oscillations and providing a level and smooth ride. A predefined amount of spring force will always be allowed to remain in order to allow the chassis to recover or return to its proper normal position within a desired amount of time, that is, the rebound damping does not effectively lock the spring at some compressed position.

It will be observed that the computation look-up tables for compression and rebound damping forces include a negative force in addition to a positive force, which is proportional to the spring compression. This is provided to allow for the additional upward force caused by the spring compression when summing the desired compression forces on the other control functions such as roll, pitch, etc. In other words, if roll control has determined the need for 100 lbs of compression force and the sprung natural frequency indicates that the spring is contributing an additional upward force of 100 lbs due to compression, the two will mathematically cancel for an optimum net composite upward force on the chassis at the end of the computer cycle. A spring extension below normal, such as when the wheel drops onto a lowered road surface or into a hole, is similarly handled with a positive compression force to compensate for the loss of upward spring force, and a negative rebound force to counteract other required rebound forces as similarly described for a bump.

STORED ENERGY

Although this term has previously been defined additional comments are appropriate. For this function, stored energy is the difference between the compressed force for equilibrium and the actual compressed force, and its effect on the sprung mass. For example, if a point on a vehicle is compressed down, it will tend to rise back up and, if raised, it will tend to drop back down. These forces act on the vehicle as a whole. Thus, if the front wheels are compressed upward by a bump, the rear of the vehicle will tend to move downward due to the resulting torque about the center of gravity of the vehicle. Therefore, all of the suspension units controlled by this invention must be considered as to their position relative to the equilibrium position.

For the detection algorithms, the conditions can be determined easily by comparing the change in position of the axle with respect to the chassis with the position at equilibrium.

With reference to the desired response, it is useful to know that all of the suspension units other than the one under control can influence the suspension unit under control, due to their stored energy, if they are not in their equilibrium position. For this reason that portion of the processing module relating to stored energy is enclosed with a dotted box 250 to indicate that the signals relate to the other suspension units but not the one under analysis. The effect of the other units is counteracted by the stored energy function by applying the correct counterdamping. For example, if a front suspension unit is compressed, it will tend to push up the front and cause a torque around the center of gravity of the vehicle and tend to compress the rear downwardly. Therefore, compression force would be increased on the rear. Likewise, rebound force would be increased on the rear in response to an extension of a suspension unit in the front.

The stored energy control process is included in this control system to handle forces on the suspension unit under control due to spring forces imposed on the rest of the chassis caused by road conditions. The operation is similar to attempting to maintain constant forces on the chassis, only the compression and rebound damping forces must act in opposite directions to counteract the forces on the chassis. In other words, if the front of the vehicle hits a rise in the road surface and the front springs are compressed, their upward force will tend to apply a torque to the vehicle tending to compress the rear springs. When the rear spring is under control, the proportion of compression on the front springs will result in increased damping force to counteract this torque and prevent the rear from sinking.

The stored energy and sprung natural frequency control functions tend to control the forces that act on a chassis due to road surface variations compressing and extending the spring and consequently applying forces to the chassis that would normally tend to move the chassis off its desired level ride. It should be noted that since the spring rates may vary due to level control for varying loads, the spring rate inputs may be used to modify the effective spring displacement so that optimum counteracting forces can be applied at all times. For the purposes of further illustration, tables IV-VII show the range of outputs for these two parameters.

TABLE IV

| $P_\Delta$ | $F_{C3}$ | $F_{R3}$ |
|---|---|---|
| +D | $-\overline{F_{C3}}$ | $+\overline{F_{R3}}$ |
| ↑ | ↑ | ↑ |
| 0 | 0 | 0 |
| ↓ | ↓ | ↓ |
| −D | $+\overline{F_{C3}}$ | $-\overline{F_{R3}}$ |

TABLE V

| $P'_\Delta$ | $F_{C4}$ | $F_{R4}$ |
|---|---|---|
| +D | $+\overline{F_{C4}}$ | $-\overline{F_{R4}}$ |
| ↑ | ↑ | ↑ |
| 0 | 0 | 0 |
| ↓ | ↓ | ↓ |
| −D | $-\overline{F_{C4}}$ | $+\overline{F_{R4}}$ |

TABLE VI

| $P''_\Delta$ | $F_{C5}$ | $F_{R5}$ |
|---|---|---|
| +D | $+\overline{F_{C5}}$ | $-\overline{F_{R5}}$ |
| ↑ | ↑ | ↑ |
| 0 | 0 | 0 |
| ↓ | ↓ | ↓ |
| −D | $-\overline{F_{C5}}$ | $+\overline{F_{R5}}$ |

TABLE VII

| $P'''_\Delta$ | $F_{C6}$ | $F_{R6}$ |
|---|---|---|
| +D | $\overline{+F_{C6}}$ | $\overline{-F_{R6}}$ |
| ↑ | ↑ | ↑ |
| 0 | 0 | 0 |
| ↓ | ↓ | ↓ |
| −D | $\overline{-F_{C6}}$ | $\overline{+F_{R6}}$ |

PUMPING DOWN

This term has previously been defined. The detection algorithms involve a short term integration (about 3 seconds) of the position of the axle with respect to the chassis and that is compared to the long term average (about 30 seconds) to detect if the position is pumping down. The response is that as the suspension unit starts to pump down, the compression force is correspondingly increased to balance the damping and limit the amount of pumping down that can occur.

The input to the processing module is $P_{ABS}$. The input range is ±D inches and the resolution of the input is $-2^{N-1}$ to $+2^{N-1}$ steps at $D/2^{N-1}$ inches per step. The intermediate equations are as follows:

$P_{NORM}$ = Long term average of $P_{ABS}$ $P_\Delta = P_{ABS} - P_{NORM}$ $\Delta P_{PD}@t = \Delta P_{PD}@t-1 + \Delta_{PD}$ (if $P_\Delta > \Delta P_{PD}@t-1$)

$\Delta P_{PD}@t = \Delta P_{PD}@t-1 - \Delta_{PD}$ (if $P_\Delta < P_{PD}@t-1$)

The outputs of the processing module will preferably be determined from a look-up table in the processor memory and will be $F_{C7}$ and $F_{R7}$. The range of the outputs will be 0 to $\overline{F_{C7}}$ for $F_{C7}$, 0 to $\overline{F_{R7}}$ for $F_{R7}$ and −D to +D for $\Delta P_{PD}$. The resolution of the outputs will be: (1) 0 to $2^{N-1}$ steps at $\overline{F_{C7}}/2^{N-1}$ pounds per step for $F_{C7}$; (2) 0 to $2^{N-1}$ steps at $\overline{F_{R7}}/2^{N-1}$ pounds per step for $F_{R7}$; and (3) $-2^{N-1}$ to $+2^{N-1}$ steps at $D/2^{N-1}$ inches per step for $\Delta P_{PD}$.

Graphically, the outputs can be represented by the following:

TABLE VIII

| $P_{PD}$ | $F_{C7}$ | $F_{R7}$ |
|---|---|---|
| +D | $\overline{F_{C7}}$ | 0 |
| ↑ | ↑ | ↑ |
| 0 | 0 | 0 |
| ↓ | ↓ | ↓ |
| −D | 0 | $\overline{F_{R7}}$ |

Pumping down is controlled by integrating the average height of a suspension unit over a period of time longer than the natural frequencies of the sprung mass but shorter than the computation of the average height ($\Delta P_{PD}$). It includes an integration of the change in height computed just as for roll or pitch control, only the actual change in height from normal for any suspension unit under control is used instead of the difference between two suspension units.

UNSPRUNG NATURAL FREQUENCY

The detection algorithms employ Discrete Fourier Transform (DFT) analysis to determine the amplitude of the frequency component at the natural frequency of the unsprung mass. The desired response is that oscillations should be critically damped. The best approach appears to be to increase compression damping as the oscillation amplitude increases to limit the level allowed and maintain good road traction by allowing easy rebound to keep the wheel on the surface, while preventing the wheel from bouncing off the surface by increased compression damping.

The input to the processing module is $P_{ABS}$ with a range of ±D inches. The resolution of the input is $-2^{N-1}$ to $+2^{N-1}$ steps at $D/2^{N-1}$ inches per step. The intermediate equation is a DFT for frequency of the unsprung mass.

The output of the processing module will preferably be determined from a look-up table in the processor memory and will be $F_{C8}$. The output range will be 0 to $\overline{F_{C8}}$ (maximum value) for $F_{C8}$ and 0 to ±D for DFT. The resolution of the outputs will be: (1) 0 to $2^{N-1}$ steps at $\overline{F_{C8}}/2^{N-1}$ pounds per step for $F_{C8}$; and (2) 0 to $2^{N-1}$ steps at $D/2^{N-1}$ inches per step for DFT.

The DFT analysis will operate in such a manner that each computer cycle would store the instantaneous position of the axle with respect to the chassis and drop an older measurement, the older measurement being an input value of position taken about 32 cycles previously. The computer would then contain the latest 32 position readings at all times. If a DFT is taken each cycle on those points in order to determine the magnitude of any oscillations at or near the natural frequency of the unsprung mass, then that DFT output would represent the magnitude of any unsprung natural frequencies that may be occurring, which is a basic function of a DFT. If compression damping is applied at increasing rates as the natural frequencies are detected, that is, the DFT output, then the energy in the resident system would be effectively dissipated and any wheel hop or loss of control would be substantially reduced or eliminated.

Since the load leveling function changes the spring rates, the effective value of the DFT could be appropriately modified to compensate for this change in spring rate or natural frequency, based on the spring rate input to the controller. The following table shows the range of outputs for unsprung natural frequency.

TABLE IX

| DFT | $F_{C8}$ |
|---|---|
| D | $\overline{F_{C8}}$ |
| ↑ | ↑ |
| 0 | 0 |

BOTTOMING OUT AND TOPPING OUT

Here again the analysis of two functions have been combined due to their similarity and relationship. Bottoming out is associated with chuck holes or excessive rebound travel while topping out is associated with high amplitude bumps or excessive compression travel. These terms have previously been defined.

Desired response for bottoming out is that this control function computes the velocity of the axle with respect to the chassis and its absolute position. It has been stated previously that the present system is velocity-independent but it should be noted that because the computer cycles are much faster than physical changes in the automobile, velocity can be computed from position inputs at any time desired. A desired response for the bottoming out parameter is that the compression damping force is progressively increased as the suspension unit approaches its minimal length to prevent any damage. The magnitude of the compression force is higher with higher velocity in order to bring the velocity to zero before bottoming out. This increasing force will help lift the chassis so that it can clear obstacles on a rough terrain.

The desired response for topping out is that the rebound damping force is progressively increased as the suspension unit approaches its maximum length to prevent damage. The magnitude of the rebound force is higher with higher velocity in order to bring the velocity to zero before topping out. Thus it can be seen that these two control functions are closely related, one being effectively the mirror image of the other.

The input to both processing modules is $P_{ABS}$ with a range of $\pm D$ inches and a resolution of $-2^{N-1}$ to $+2^{N-1}$ steps at $D/2^{N-1}$ inches per step. The intermediate equation is $$V_{ABS} = P_{ABS}@t - P_{ABS}@t-1.$$

The outputs of the processing modules will preferably be determined from a look-up table in the processor memory and will be $F_{C9}$ and $F_{R9}$. The range of the output will be 0 to $\overline{F_{C9}}$ (maximum value) for $F_{C9}$, 0 to $\overline{F_{R9}}$ (maximum value) for $F_{R9}$ and $-\overline{V_{ABS}}$ to $+\overline{V_{ABS}}$ for $V_{ABS}$. The resolution of the outputs will be: (1) 0 to $2^N$ steps at $\overline{F_{C9}}/2^N$ pounds per step for $F_{C9}$; (2) 0 to $2^N$ steps at $\overline{F_{R9}}/2^N$ pounds per step for $F_{R9}$; and (3) $-2^M$ to $+2^M$ steps at $\overline{V_{ABS}}/2^M$ inches per second per step for $V_{ABS}$.

This control process independently increases compression damping as the axle approaches bottoming out and increases rebound damping as the axle approaches topping out. In other words, as the shock absorber or damping device is approaching its minimum compressed length during a bump, the controller monitors the position and velocity of the axle with respect to the chassis, and increases the compression damping force to whatever level is required to stop the movement before bottoming out can occur. This is of course limited by the design limits of the compression force and in the case of a large bump, it forces the mass of the vehicle up and over the obstacle with a smooth and evenly controlled force. Rebound control likewise increases the rebound damping force to prevent the axle from approaching its maximum extension from the chassis without first bringing it to a stop, also smoothly. The diagram of FIG. 10 shows the bottoming out and topping out control function dynamics. Note that as position increases left or right from the center line, the compression force increases but only with increased velocity. Thus there are two parameters, and either one can be increasing in order to increase the compression force. At greater velocities the force increases at much smaller position changes to allow time to smoothly decelerate the axle. Likewise the rebound force on the negative side of the position and velocity also increases with those two parameters value increases.

HEIGHT CONTROL

This is often referred to as load leveling and is the long term increase or decrease of the spring rate to keep the sprung mass at a desired average height above the road surface. It functions with a controllable spring such as the air spring shown in FIGS. 2 and 3. This function uses the long term average position of the axle with respect to the chassis and the absolute position.

The algorithm provided allows for adaptive control of the height of each suspension unit so that variations in height between the front and rear of the vehicle can be accommodated for such things as to aid in aerodynamics for fuel economy, or to raise the chassis for improved clearance when going over bumpy roads.

The desired response of the height control function is to provide adaptive load levelings so that on smooth roads, such as freeways, the vehicle lowers for improved aerodynamics. When a rough road or bumps are encountered, it automatically raises to a height that offers sufficient dynamic range for the bumps. The maximum values of the absolute positions as they occur, that is, its peaks above normal, indicate the surface, and the height can then be adaptively adjusted to allow the desired dynamic range for covering the road surface.

The input to the processing module is $P_{ABS}$ with a range $\pm D$ inches and a resolution of $-2^{N-1}$ to $+2^{N-1}$ steps at $D/2^{N-1}$ inches per step. The intermediate equations are as follows:

If $P_\Delta$ (any wheel) $> H$, then $H@t = H@t-1 + K\Delta_H$

If $P_\Delta$ (any wheel) $\leq H$, then
$H@t = H@t-1 - \Delta_H(H \geq 0)$ $P_{AVE}$ = Average of $P_{ABS}$ The output of the processing module will preferably be determined from a look-up table in the processor memory and will be $P_H$, the desired height. The actual outputs $SR_I$ and $SR_D$ will serve to adjust for that height. If $P_{AVE} > P_H + \Delta P_H$, supply pressurized air to air spring until $P_{AVE} < P_H$, at which time check for $P_{AVE} > P_H + \Delta P_H$ before adding further pressure. If $P_{AVE} < P_H - \Delta P_H$, release air from air spring until $P_{AVE} > P_H$, at which time check for $P_{AVE} < P_H - \Delta P_H$ before releasing air again. Graphically, the outputs can be represented by the following:

TABLE X

| H | $P_H$ |
|---|---|
| 0 | 0 |
| ↓ | ↓ |
| +D | −D |

In this function, one or more axle positions are monitored each computer cycle with respect to the normal chassis position. A type of integration similar to that of the roll control function is then implemented which generates an intermediate signal (H) that is representative of the size of bumps encountered (SURFACE in FIG. 7). In the integration we add K times $\Delta H$ where $\Delta H$ is the constant of integration. As the bumps become smaller, the value of H decreases more slowly where we add only $\Delta H$ in the integration. This is because when bumps are first encountered, the chassis must be raised fairly rapidly to allow proper clearance for future bumps that could be expected. When no bumps are encountered, the chassis will slowly lower to optimum ride height as previously described.

The desired ride height obtained from the look-up table in the processor for a given H is processed with hysteresis $\Delta P_H$ so that the control of the spring rate doesn't keep changing too rapidly between increasing and decreasing commands, thereby resulting in smoother control. In other words, the chassis will rise up adaptively to accommodate bumps and automatically lower when no bumps are encountered.

SUMMARY OF EXAMPLES

The preceding examples have been provided to demonstrate how the given algorithms may be implemented and why they control the dynamics specified. At the end of each computer cycle, a desired compression and rebound damping force, as well as a string rate control parameter, have been computed for each suspension unit and for each control function such as roll, pitch, etc. Each suspension unit is capable of only one composite rebound or compression force so that the desired forces must be appropriately combined to form the optimum compression and rebound forces. The well-known mathematical principle of superposition applies here. A number of individual parameters, each separately calculated, are added directly to form a sum or composite that provides the proper result for each as a total. Therefore, as given in the algorithms, the desired compression forces for all of the dynamics associated with a given suspension unit are added together to obtain one desired compression force for that unit, represented by block 252 in FIG. 7. This is repeated for each unit for both compression and rebound (block 254), to obtain complete and optimum control in real time. The formulas for these composite times appear as follows:

$$F_C = \Sigma F_{Ci} = F_{C1} + F_{C2} \ldots F_{C9}$$

$$F_R = \Sigma F_{Ri} = F_{R1} + F_{R2} \ldots F_{R9}$$

The above formulas apply to one suspension unit. For total control each suspension unit has inputs of a composite $F_C$ and $F_R$ for each controller cycle time. Most intermediate computations are done once and shared among the suspension units as would be easily perceived from the preceding discussion. Each controller update cycle time computes the next setting for $F_C$ and $F_R$ using the tables in memory and summing in accordance with the above equations.

It is well to note that the apparent complexity is more apparent than real. For example, many computed parameters such as $P_\Delta$ are done only once per cycle per suspension unit. Only their usage changes. For example, $P_\Delta$ for roll control of the left front wheel is $P'_\Delta$ for roll control of the right front wheel and $P''_\Delta$ for pitch control of the left rear wheel, and so on. In addition, the tables stored for the table look-up operations are also shared. The table given in the example for roll control could apply to all four suspension units, that is, only one table for roll control would be required in the entire software.

When properly applied to the appropriate suspension units, these control algorithms will result in smoothly varying control forces that are essentially independent of what the wheels are doing. These forces will be stabilizing and controlling the vehicle in a near optimum way. When necessary, such as in bottoming out control, forces will be applied to the chassis but only as required and will smoothly and comfortably vary rates of change.

Figure 11:
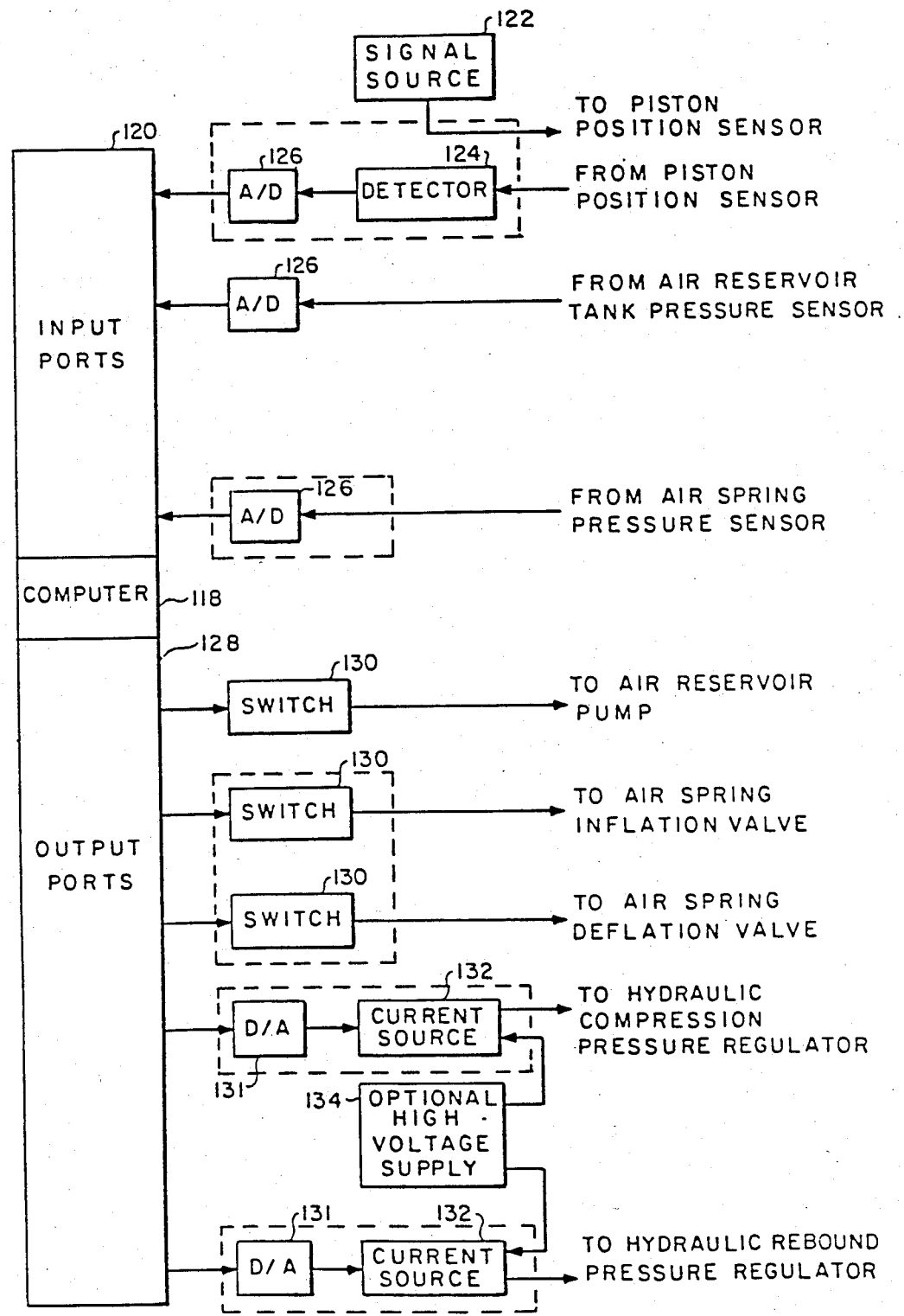
FIG. 11 is a block diagram of one form of the control system of the invention as applied to the structure of FIGS. 2 and 3.

A preferred embodiment of control 22 will now be described with reference to FIG. 11. The components illustrated within the dotted outlines may be repeated as necessary dependent upon the desired system control. This control system simultaneously controls all of the suspension units associated with the different wheels of the vehicle and specifically refers to the suspension unit shown in FIGS. 2 and 3. The control includes a computer 118 such as a microprocessor having suitable RAM and ROM memories coupled to the microprocessor for storing computation information and operational programs, respectively. The computer has input ports 120 connected thereto for receiving signals from various transducers within the suspension units. Referring to FIG. 3, these include the piston position sensors or transducers 82 on each suspension unit and air pressure sensors 99 and 101 on some or all of these suspension units.

While hydraulic sensor 82 comprises a transducer, a signal source 122 may be connected to the input of the transducer and the output of the transducer is connected to detector 124. Analog to digital converters 126 convert the analog signals from the transducers in the suspension units into digital form before they are input to computer 118 through the input ports. Using the operational programs stored in the ROM of the computer, the microprocessor continuously determines the optimum compression and rebound damping forces as well as the optimum spring rate. Commands are sent from the computer to control pump 96, air pressure inlet and outlet regulators 40 and 42 on some or all of the suspension units and compression and rebound regulators 36 and 38 on each suspension unit.

Output ports 128 provide the interface between computer 118 and the devices which it controls. Digitally controlled switches 130 are utilized to turn air pump 96 on and off and to open and close the air pressure valves 40 and 42. Digital to analog converters 131, current sources 132 and optional high voltage supply 134 are utilized to generate the signals necessary to control hydraulic compression and rebound pressure regulators 36 and 38.

Figure 13:
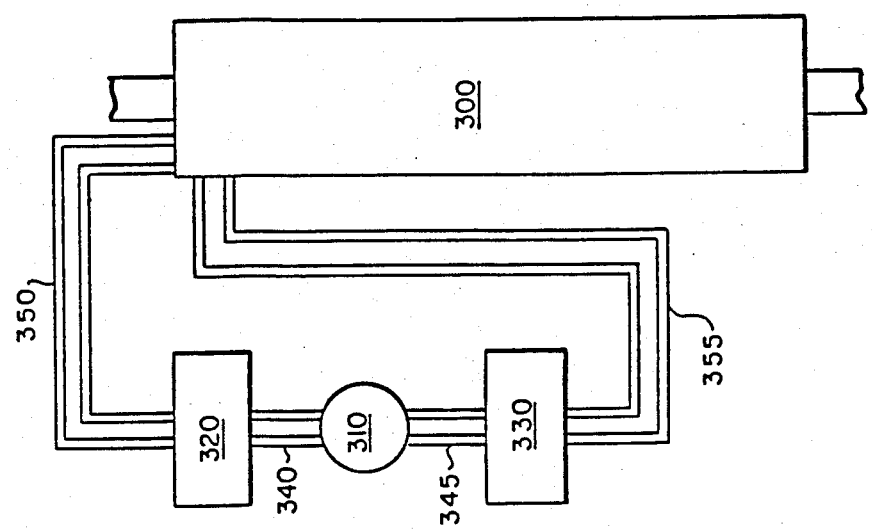
FIG. 13 is another alternative embodiment similar to FIG. 12 but with a higher performance shock absorber.
Figure 12:
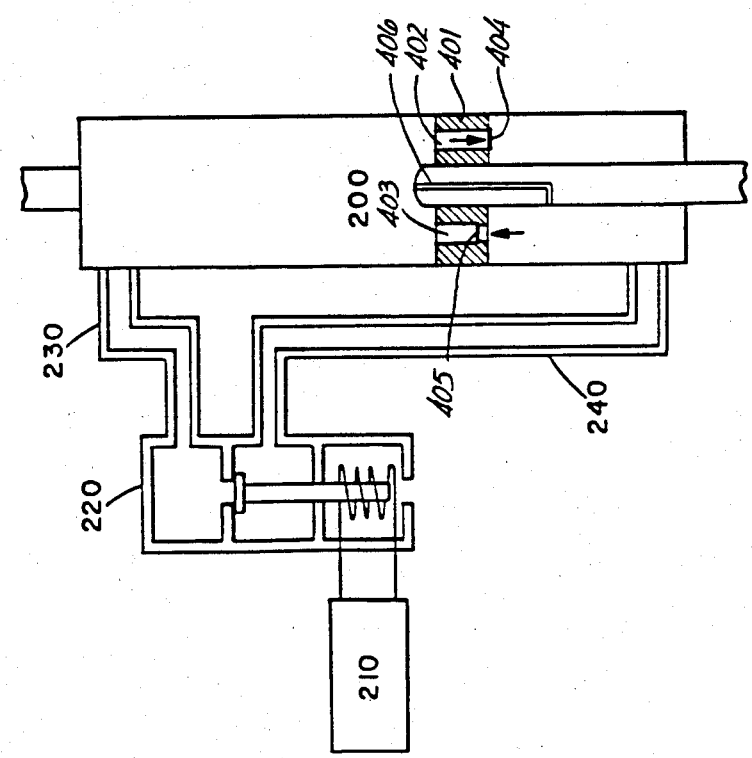
FIG. 12 is an alternative arrangement for a controllable simple shock absorber.

Variations of the system are illustrated in FIGS. 12 and 13. FIG. 12 shows the simplest possible electrically controllable shock absorber. Shock absorber 200 is that of any conventional design. The variation is that the first stage valving or "bleed orificing" includes orifice 406 in a piston 401 which is set for very rapid pressure buildup or may be removed from improved roll control and performance.

An example of this type of valving is provided in FIG. 12. The sectional view of piston 401 shows a pair of orifices 402 and 403 extending through piston 401 to provide passageways for hydraulic fluid to flow between compression and rebound chambers during reciprocation by the piston. A spring loaded valve 404, at the lower opening of orifice 402, when a certain pressure is reached, operates to allow hydraulic fluid to flow through the orifice during compression of the shock absorber but remains closed during rebound. Conversely, a spring loaded valve 405, at the lower opening of orifice 403, operates to allow fluid to flow through the orifice when a certain pressure is reached during rebound of the shock absorber but remains closed during compression. The diameter of these orifices may be selected to provide the appropriate valve characteristics. It is to be understood that other conventional high performance valving could also be used in this variation of the invention. For example, the bleed orifice 406 may be eliminated.

Although the valves in the piston and orifice 406 have been described with reference to FIG. 12, these same elements may be employed with the piston 58 and rod 24 in the embodiment of FIG. 3 which includes springs 68 and 70.

A solenoid pressure regulator valve 220 of the preferred embodiment is connected to the compression chamber by means of conduit 230 and to the rebound chamber by means of conduit 240. Control 210, which may be either manual or automatic, can be made to set the initial first stage blow off pressure on compression to any level from very little pressure for soft control to very high pressure for stiff control. This is accomplished by allowing valve 220 to bypass the fluid flow around the first stage orificing within shock absorber 200 upon compression.

FIG. 13 illustrates a variation that is capable of much higher performance. In FIG. 3, the fluid pressure in chamber 61 is obtained by fluid flow through passage 114 due to the bias pressure generated by the action of spring 79 on spool 74. This flow is limited for soft ride characteristics. If chamber 61 is isolated from the fluid in the shock absorber and connected to an external fluid pressure supply as shown in FIG. 13, then faster response may be obtained. Referring specifically to FIG. 13, shock absorber 300 is that shown in FIG. 3 but with spring 79 removed and passage 114 blocked. Passage 88 in FIG. 3 is connected to passage 350 in FIG. 13. Passage 89 in FIG. 3 is connected to passage 355 in FIG. 13. The operation of the system illustrated in FIG. 13 is as follows.

The blow off pressure of spool 74 in FIG. 3 is still set by the pressure on chamber 61. However, the fluid pressure in chamber 61 is set by valve 36 with the fluid flow into chamber 62 provided through passage 350 from a high pressure fluid accumulator 320 as shown in FIG. 13. The return fluid flow from valve 36 in FIG. 3 goes to a fluid reservoir 330. Pump 330 is then connected between accumulator 320 and reservoir 330 by means of passages 340 and 345 to recharge accumulator 320.

It should be apparent that there are many variations of the shock absorber structure and the control connections which may utilize the pressure regulator solenoid valve and amplifying valve in different combinations. In particular, the amplifying valve can have spring 80 removed and spools 74 and 76 attached as one unit. The main blow off orifice 115 would normally be open. When pressure in chamber 61 is increased due to valve 36, the larger area at spool 76 is attached directly to spool 74 and the blow off flange causes the pressure in chamber 60 to reach a multiple of that in chamber 61 at all times for much higher performance.

Another variation of valve 72 occurs when amplification is not required. In this case spring 78 is removed and spool 76 is rigidly attached to the valve body such as at seat 117. The surface area of spool 74 facing chamber 61 can be made equal to the surface area of spool 74 facing chamber 60. In such case pressure settings in chamber 61 are equal to that in chamber 60 for blowoff conditions at orifice 115.

There are a number of key points and factors which are important to keep in mind with respect to this invention and which have been referred to above. A listing of these factors follows:

1. any number of parameters can be accommodated by the system, for example, pumping down may be omitted, or others may be added.

2. The description is for a four-wheel vehicle, but the principles are applicable to any number, even a multi-wheeled vehicle for off road or military use.

3. Position of the main piston in the shock absorber represents the position of the axle with respect to the chassis.

4. Position output signals are not necessarily required from every suspension unit of a vehicle, but it is highly desirable that there by position signals from each wheel of a four-wheel vehicle.

5. The desired responses programmed in FIG. 7 can be determined either from solution of equations or table look-up, with the latter generally being faster.

6. Spring rate output signals may be from any number of the suspension units, from zero to all the springs.

7. Similarly, the spring rate controls ($SR_I$ and $SR_D$) can be any number, for example both front springs or both rear springs can be controlled together, or all four can be controlled together.

8. Actual calculations performed can be simplified by using many results in common with others, but the principles of analysis can be considered separately for each parameter.

9. The control algorithms may be any type or form desired. Those provided are by way of example and for purposes of completeness of description.

10. This system applies to any suspension unit capable of having a signal output representing position and being controllable by inputs that control compression and rebound damping.

11. The system provides the enumerated advantages at relatively low cost and weight, improves aerodynamics with the height control function, adapts for wear automatically, utilizes conventional manufacturing, is highly reliable, employs low (10%) tolerance components and provides a luxury ride simultaneously with high stability performance.

In summary, this control system provides a cost effective suspension using microprocessor technology to achieve fundamental suspension control of any vehicle while approaching the theoretical limit of suspension performance and providing near ideal ride characteristics.

In view of the above description and examples, it is likely that modifications and improvements which are within the scope of the accompanying claims will occur to those skilled in the art.

What is claimed:

1. A control system for one or more damping devices comprising extensible shock absorber means for damping between two masses in compression and rebound directions, sensor means for generating signals representative of the degree of the extension of the shock absorber means, and regulator means responsive to independent compression control signal and rebound control signal for adjusting, respectively, the compression direction force and the rebound direction force presented by the shock absorber means to the extension, the control system comprising:

means for receiving signals, representative of the degree of the extension, generated by the sensor means, processing means for processing the received signals to determine one or more independent parameters each representative of a distinct state of motion of the two masses, for using each of the parameters to determine, for each of the shock absorber means, a desired independent response for each of the distinct states of motion, and for processing the desired independent responses for each of the individual shock absorber means to form compression control signal and rebound control signal for each of the regulator means.

2. A system according to claim 1 wherein the processing means is a digital processor adapted to sample the received signals rapidly a plurality of times per second and for providing the control signals rapidly a plurality of times per second.

3. A system as described in claim 1 wherein the processing means is adapted to permit altering of the desired independent response that the processing means determines for given parameters.

4. A system as described in claim 1 wherein the processing means comprises a table for use by the processing means for converting the parameters to the desired independent responses.

5. A control system for a plurality of damping devices, each damping device comprising extensible shock absorber means for damping between sprung and unsprung masses in a vehicle, sensor means for generating signals representative of the degree of extension of the shock absorber means, and regulator means responsive to independent compression control signal and rebound control signal for adjusting, respectively, the compression direction force and the rebound direction force presented by the shock absorber means to the extension, the control system comprising:
means for receiving signals generated by each of the sensor means representative of the degree of extension, processing means adapted to determine from the received signals a plurality of independent parameters each representative of a distinct state of motion of the vehicle, for using the plurality of parameters to determine, for each individual shock absorber means, a desired independent response for each of the distinct states of motion, and for processing the desired independent responses for each of the individual shock absorber means to form, for each of the regulator means, independent compression control signal and rebound control signal.

6. A control system according to claim 5 comprising means for providing the independent compression control signal and rebound control signal to each regulator means.

7. A control system according to claim 5 wherein the processing means comprises a digital microprocessor.

8. A control system according to claim 5 wherein one of the parameters is a function of the amount of roll of the vehicle.

9. A control system according to claim 5 wherein at least one of the parameters is a function of the amount of pitch of the vehicle.

10. A control system according to claim 5 wherein at least one of the parameters is a function of the amount of pump-down of at least one of the damping devices.

11. A control system according to claim 5 wherein at least one of the parameters is a function of the amount of stored energy in a compression spring.

12. A control system according to claim 5 wherein at least one of the parameters is a function of the amount of natural frequency of the unsprung mass.

13. A control system according to claim 5 wherein at least one of the parameters is a function of the amount of natural frequency of the sprung mass.

14. A control system according to claim 5 wherein at least one of the parameters is a function of the susceptibility of the sprung mass to bottom-out against the unsprung mass.

15. A control system according to claim 5 wherein at least one of the parameters is a function of the susceptibility of the sprung mass to top-out against the unsprung mass.

16. A control system according to claim 5 wherein the processing means is adapted to permit selective altering of the desired independent response that the processing means will determine from the parameter representative of a distinct state of motion determined.

17. A control system according to claim 5 wherein the processing means is adapted to determine the desired independent responses from the parameters representative of a distinct state of motion by using a table cross-referencing the appropriate responses for all parameters.

18. A control system for a vehicle according to claim 5 wherein there is, corresponding to each damping device, controllable air spring means wherein the processing means is adapted to determine, from the signals generated by the extension sensor means, a plurality of further parameters each representative of a further distinct state of motion of the vehicle, for using the plurality of further parameters to determine, for each air spring means, a further desired independent response for each of the further distinct states of motion, and for processing the further desired independent responses for each of the independent controllable air spring means for forming a control signal for controlling spring rate in each controllable air spring means.

19. A control system according to claim 18 wherein there is at least one pressure sensor means for sensing the pressure in at least one of the controllable air spring means, and further comprising means for receiving signals generated by the at least one pressure sensor means, the processor means further being adapted for using such received signal in determining at least one of the desired independent responses, thereby improving the same.

20. A control system according to either of claims 5 or 18 wherein the processing means is adapted for combining the independent responses together to form the control signals.

21. A method for controlling one or more damping devices comprising extensible shock absorber means for damping between two masses in compression and rebound directions, sensor means for generating signals representative of the degree of the extension of the shock absorber means, and regulator means responsive to independent compression control signal and rebound signal for adjusting, respectively, the compression direction force and the rebound direction force presented by the shock absorber means to the extension, the method comprising:
receiving the signals, representative of the degree of the extension, generated by the sensor means, processing the received signals to determine one or more independent parameters each representative of a distinct state of motion of the two masses, determining a desired independent response from the independent parameters for each of the distinct states of motion, and forming a compression control signal and a rebound control signal for each of the regulator means from the determined desired independent response.

22. A method for controlling a plurality of damping devices, each damping device comprising extensible shock absorber means for damping between sprung and unsprung masses in a vehicle, sensor means for generating signals representative of the degree of extension of the shock absorber means, and regulator means responsive to independent compression control signal and rebound control signal for adjusting, respectively, the compression direction force and the rebound direction force of the shock absorber means to the extension, the method comprising:

receiving signals generated by each of the sensor means representative of the degree of extension, determining therefrom a plurality of independent parameters each representative of a distinct state of motion of the vehicle, using the plurality of parameters to determine, for each individual shock absorber means, a desired independent response for each of the distinct states of motion, and processing the desired independent responses for each of the individual shock absorber means to form, for each of the regulator means, independent compression control signal and rebound control signal.

23. A method according to claim 22 comprising the step of providing the compression control signal and the rebound control signal to each of the shock absorber means.

24. A method according to claim 22 wherein the steps of determining and processing comprise the step of programming a digital microprocessor.

25. A method according to claim 22 wherein at least one of the parameters is a function of the amount of roll of the vehicle.

26. A method according to claim 22 wherein at least one of the parameters is a function of the amount of pitch of the vehicle.

27. A method according to claim 22 wherein at least one of the parameters is a function of the amount of pump-down of at least one of the damping devices.

28. A method according to claim 22 wherein at least one of the parameters is a function of the amount of stored energy in a compression spring.

29. A method according to claim 22 wherein at least one of the parameters is a function of the amount of natural frequency of the unsprung mass.

30. A method according to claim 22 wherein at least one of the parameters is a function of the amount of natural frequency of the sprung mass.

31. A method according to claim 22 wherein at least one of the parameters is a function of the susceptibility of the sprung mass to bottom-out against the unsprung mass.

32. A method according to claim 22 wherein at least one of the parameters is a function of the susceptibility of the sprung mass to top-out against the unsprung mass.

33. A method according to claim 22 wherein the processing means is adapted to permit selective altering of the desired independent response that the processing means will determine from the parameter representative of a distinct state of motion determined.

34. A method according to claim 22 wherein the processing means is adapted to determine the desired independent responses from the parameters representative of a distinct state of motion by using a table cross-referencing the appropriate responses for all parameters.

35. A method according to claim 22 wherein there is, corresponding to each damping device, controllable air spring means wherein processing includes determining, for each air spring means, a further desired independent response for each of the further distinct states of motion from the signals generated by the extension sensor means, and processing the further desired independent responses for each of the independent controllable air springs for forming a control signal for controlling spring rate in each controllable air spring.

36. The method of claim 35 further including sensing the pressure of at least one of the controllable air spring means and generating signals corresponding to the sensed pressure, the processing step further including determining the further desired independent response in response to the sensed pressure signals thereby improving the same.

37. A method according to either of claims 22 or 35 wherein the steps of processing comprise the steps of combining the independent responses together to form the control signals.

38. A system for controlling a plurality of damping devices comprising:
a cylinder for receiving hydraulic fluid;
a piston rod;
a piston mounted on the piston rod which is reciprocable within the cylinder and defines therein a compression chamber and a rebound chamber on opposite sides of the piston;
sensor means for generating signals representative of the position of the piston within the cylinder;
pressure regulator means coupled to the compression chamber and pressure regulator means coupled to the rebound chamber for independently adjusting the pressure of the hydraulic fluid in the respective chambers during reciprocation of the piston in response to predetermined signals applied thereto; and
control means receiving the signals from the sensor means characterized for using the signals to determine the appropriate signals to be applied to each pressure regulator means for optimal damping.

39. A system for controlling a plurality of damping devices as described in claim 38 wherein the damping devices are each adapted to be connected between a different point on sprung and unsprung masses of a vehicle to damp the relative motion of the masses with respect to one another and the control means is further operative for processing the signals received from all the sensor means for determining and applying signals to each pressure regulator means for composite optimal damping of the vehicle.

40. A controllable suspension system comprising: a plurality of suspension units, each unit comprising:
spring means;
sensor means in communication with the spring means for generating signals representative of the spring rate of the spring means;
regulator means coupled to the spring means for adjusting the spring rate of the spring means in response to determined signals applied thereto;
shock absorber means;
sensor means in communication with the shock absorber means for generating signals representative of the degree of extension of the shock absorber means;
regulator means coupled to the shock absorber means for independently adjusting the compression damping force of the shock absorber means and the rebound damping force of the shock absorber means in response to predetermined signals applied thereto; and
control means receiving the signals from the sensor means characterized for using them to determine the signals to be applied to each suspension unit regulator means for optimal performance of the suspension system.

41. A system as described in claim 40 wherein the suspension units are each adapted to be connected between different points on sprung and unsprung masses of a vehicle to cushion and damp the relative motion of the masses with respect to one another, and the control means is further operative for processing the signals received from all the sensor means for determining and applying the signals to each regulator means for composite optimal ride and handling characteristics for the vehicle.

42. A damping system for control of long and short term variations of damping of wheel supporting a vehicle chassis, independently, in compression and rebound directions, the system comprising:
a plurality of separate fluid controlled dampers, each of the dampers comprising a movable member adapted to be connected to one of such wheels, a compression fluid control means and a rebound fluid control means, each damper being responsive to control signals applied to the compression fluid control means and to the rebound fluid control means for control of the damping, relative to such chassis, of the corresponding member, and the wheel connected to such member in, respectively, compression and rebound directions;
a plurality of sensors comprising an individual sensor for each damper for sensing displacement of a wheel, which is connected to such damper, relative to such chassis; and
control means coupled to all said sensors for applying control signals to the compression and rebound fluid control means of all said dampers and comprising means responsive to the sensors for varying the control signal applied to the compression fluid control means separate from the varying of the control signal to the rebound fluid control means for any of the dampers.

43. A damping system according to claim 42 wherein the control means comprises:
means for controlling the control signals to each of the inputs of each damper so as to cause each of the dampers to present preselected damping to the corresponding member, and a connected wheel, relative to such chassis for a time period; and
means responding to a momentary change, during the time period, in the second displacement of at least one of the sensors for momentarily, during the time period, varying the control signal applied to at least one of the inputs for at least one of the dampers separate from the control signal applied to the other input of the same damper.

44. A controlled damper for damping the relative motion between two masses comprising:
a cylinder connected to one of the masses;
a piston having a rod connected to the other of the masses, the piston received into the cylinder for telescopic compression motion as the masses move together and rebound motion as the masses move apart, the piston defining a separate fluid filled compression chamber and rebound chamber within the cylinder;
means for providing for restricted fluid communication between the chambers during compression and rebound motion;
such restricted fluid communication damping such motion at a rate dependent upon a selected damping force; and
means for separately controlling the restricted communication during compression motions to establish a desired compression damping force and during rebound motion to establish a desired rebound damping force.

45. A control system for one or more damping devices comprising extensible shock absorber means for damping between two masses in compression and rebound directions, sensor means for generating signals representative of the degree of extension of the shock absorber means, and regulator means responsive to at least one control signal for adjusting at least one of the compression direction force and the rebound direction force presented by the shock absorber means to the extension, the control system comprising:
means for receiving signals, representative of the degree of extension, generated by the sensor means, processing means for processing the received signals to determine one or more independent parameters each representative of a distinct state of motion of the two masses, for using each of the parameters to determine, for each of the shock absorber means, a desired independent response for each of the distinct states of motion, and for processing the desired independent for each of the individual shock absorber means to form at least one control signal for at least one of the regulator means.

46. A method for controlling one or more damping devices comprising extensible shock absorber means for damping between two masses in compression and rebound directions, sensor means for generating signals representative of the degree of extension of the shock absorber means, and regulator means responsive to at least one control signal for adjusting at least one of the compression direction force and the rebound direction force presented by the shock absorber means to the extension, the method comprising:
receiving the signals, representative of the degree of extension, generated by the sensor means, processing the received signals to determine one or more independent parameters each representative of a distinct state of motion of the two masses, determining a desired independent response from the independent parameters for each of the distinct states of motion and forming at least one control signal for at least one of the regulator means from the determined desired independent response.

* * * * *